United States Patent
Hong et al.

(10) Patent No.: US 10,540,003 B2
(45) Date of Patent: Jan. 21, 2020

(54) HEAD MOUNTED DISPLAY DEVICE AND METHOD FOR CONTROLLING THE SAME

(71) Applicant: LG ELECTRONICS INC., Seoul (KR)

(72) Inventors: Jihee Hong, Seoul (KR); Yunmi Kwon, Seoul (KR); Heonjae Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 15/456,445

(22) Filed: Mar. 10, 2017

(65) Prior Publication Data
US 2017/0322622 A1   Nov. 9, 2017

(30) Foreign Application Priority Data

May 9, 2016   (KR) .......................... 10-2016-0056539

(51) Int. Cl.
*G06F 3/01*    (2006.01)
*G06F 3/041*   (2006.01)
(Continued)

(52) U.S. Cl.
CPC .............. *G06F 3/012* (2013.01); *G06F 3/041* (2013.01); *G06F 3/0488* (2013.01);
(Continued)

(58) Field of Classification Search
CPC ...... G06F 3/017; G06F 3/041; G06F 3/04845; G06F 3/04847; G06F 3/04855;
(Continued)

(56) References Cited

U.S. PATENT DOCUMENTS 6,765,557 B1   7/2004  Segal et al.
8,643,951 B1 * 2/2014  Wheeler ................. G06F 3/012
                                                 359/630
(Continued)

FOREIGN PATENT DOCUMENTS

EP   2894849   7/2015
EP   3001406   3/2016
(Continued)

OTHER PUBLICATIONS

European Patent Office Application Serial No. 17150506.8, Search Report dated Aug. 7, 2017, 24 pages.
(Continued)

*Primary Examiner* — Patrick N Edouard
*Assistant Examiner* — Douglas M Wilson
(74) *Attorney, Agent, or Firm* — Lee, Hong, Degerman, Kang & Waimey

(57) ABSTRACT

A head mounted display (HMD) device and a control method thereof are disclosed. An HMD device according to the present disclosure may include a communication unit configured to perform communication with a mobile terminal, a display unit displayed with a first region of virtual space content received from the mobile terminal, and a controller configured to display an image object for generating a command for a command input region in the first region and control the image object to move along a user's head gesture when the command input region is displayed in the first region. Furthermore, the controller may fix the image object to the first region while the first region of the virtual space content is switched to a second region corresponding to the user's head gesture when the command input region disappears.

14 Claims, 25 Drawing Sheets

(51) Int. Cl.
*G06F 3/0484* (2013.01)
*G06F 3/0485* (2013.01)
*G06F 3/0488* (2013.01)

(52) U.S. Cl.
CPC ...... *G06F 3/04845* (2013.01); *G06F 3/04847* (2013.01); *G06F 3/04855* (2013.01)

(58) Field of Classification Search
CPC .... G06F 3/0488; G06F 3/0346; G06F 3/0362; G06F 3/048; G06F 3/011–3015; G06T 19/006

See application file for complete search history.

(56) References Cited

U.S. PATENT DOCUMENTS

| | | | | |
|---|---|---|---|---|
| 8,799,810 | B1* | 8/2014 | Wheeler | G06F 3/012 348/208.99 |
| 2002/0008691 | A1* | 1/2002 | Hanajima | G06F 3/04847 345/173 |
| 2006/0190833 | A1* | 8/2006 | SanGiovanni | G06F 3/04883 715/767 |
| 2006/0284792 | A1* | 12/2006 | Foxlin | G02B 27/017 345/8 |
| 2009/0288039 | A1* | 11/2009 | Mail | G06F 3/038 715/815 |
| 2010/0079356 | A1 | 4/2010 | Hoellwarth | |
| 2012/0188148 | A1 | 7/2012 | DeJong | |
| 2012/0249741 | A1* | 10/2012 | Maciocci | G06F 3/011 348/46 |
| 2013/0127980 | A1 | 5/2013 | Haddick et al. | |
| 2013/0139082 | A1* | 5/2013 | Wheeler | G06F 3/012 715/765 |
| 2013/0246967 | A1* | 9/2013 | Wheeler | G06F 3/012 715/784 |
| 2014/0164963 | A1* | 6/2014 | Klemenz | G06F 3/04883 715/765 |
| 2014/0289642 | A1* | 9/2014 | Prasad | G06F 3/048 715/745 |
| 2014/0368535 | A1* | 12/2014 | Salter | G02B 27/017 345/619 |
| 2014/0375683 | A1* | 12/2014 | Salter | G06F 3/013 345/633 |
| 2015/0049018 | A1* | 2/2015 | Gomez | G09G 3/001 345/156 |
| 2015/0198811 | A1* | 7/2015 | Hoellwarth | G02B 27/017 345/8 |
| 2015/0277699 | A1* | 10/2015 | Algreatly | G06F 3/04815 715/850 |
| 2016/0027214 | A1 | 1/2016 | Memmott et al. | |
| 2016/0133052 | A1* | 5/2016 | Choi | G06T 19/006 345/633 |
| 2016/0182930 | A1* | 6/2016 | Ortiz | G06K 9/00758 725/25 |
| 2016/0246384 | A1* | 8/2016 | Mullins | G06F 3/017 |
| 2017/0212669 | A1* | 7/2017 | Kim | G06F 3/011 |
| 2017/0293351 | A1* | 10/2017 | Li | G02B 27/017 |
| 2018/0164588 | A1* | 6/2018 | Leppanen | G06F 3/012 |

FOREIGN PATENT DOCUMENTS

| | | |
|---|---|---|
| WO | 2015116972 | 8/2015 |
| WO | 2015129966 | 9/2015 |

OTHER PUBLICATIONS

European Patent Office Application Serial No. 17150506.8, Search Report dated Apr. 12, 2017, 8 pages.

* cited by examiner

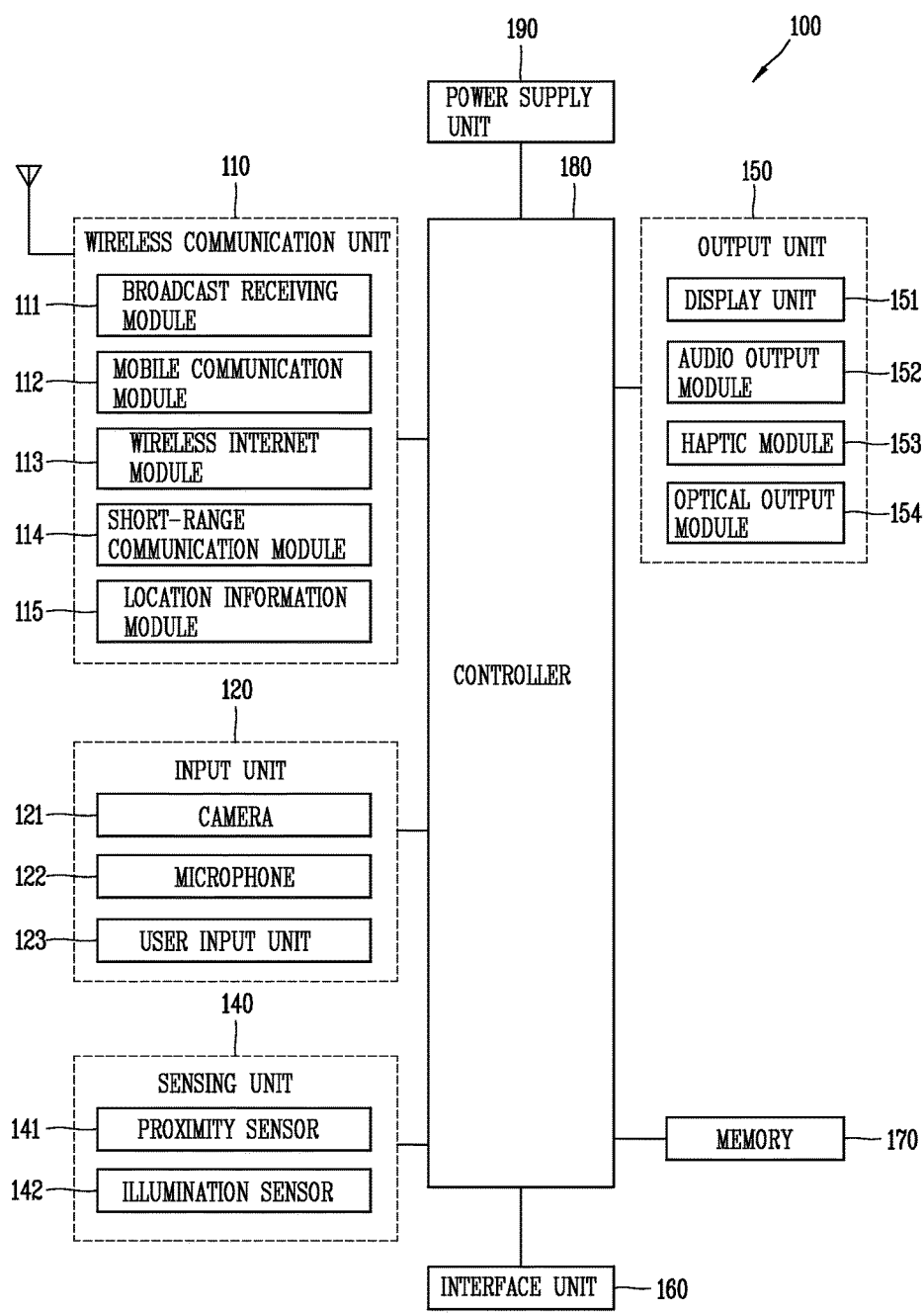

FIG. 5A
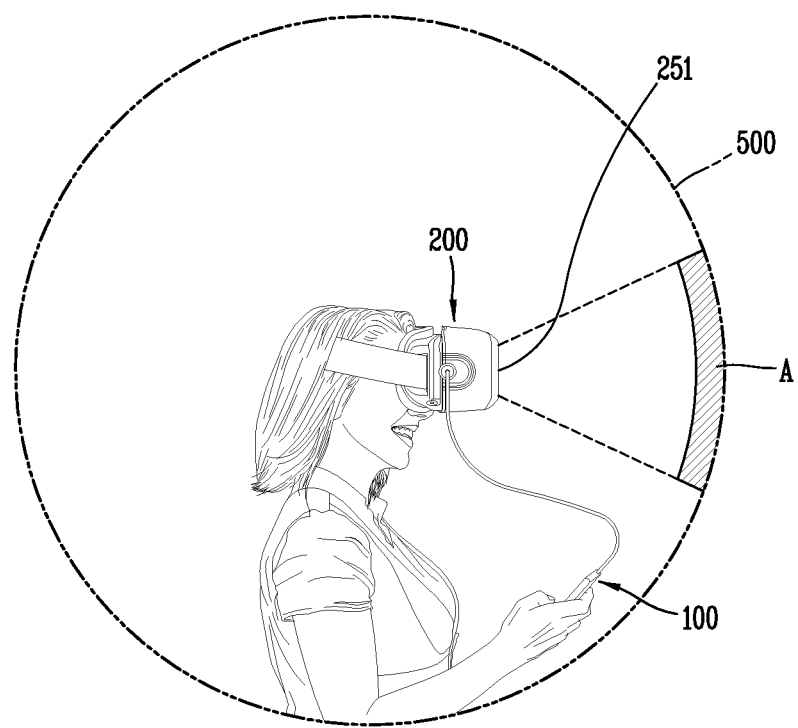
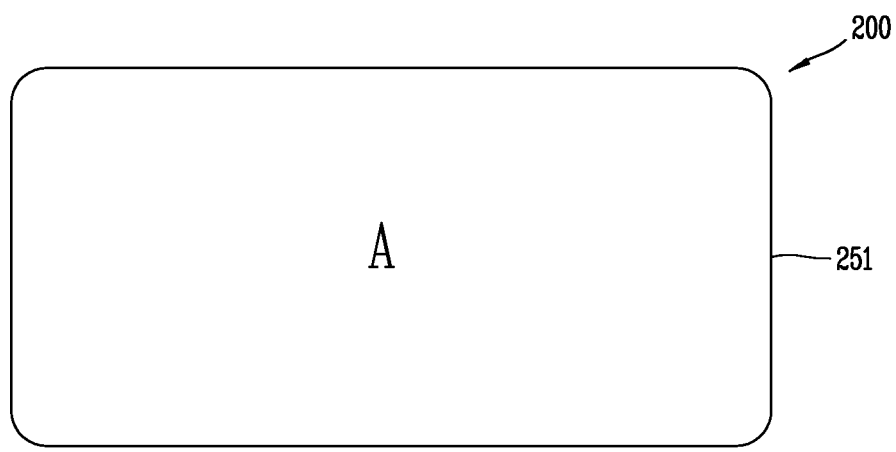

FIG. 5B
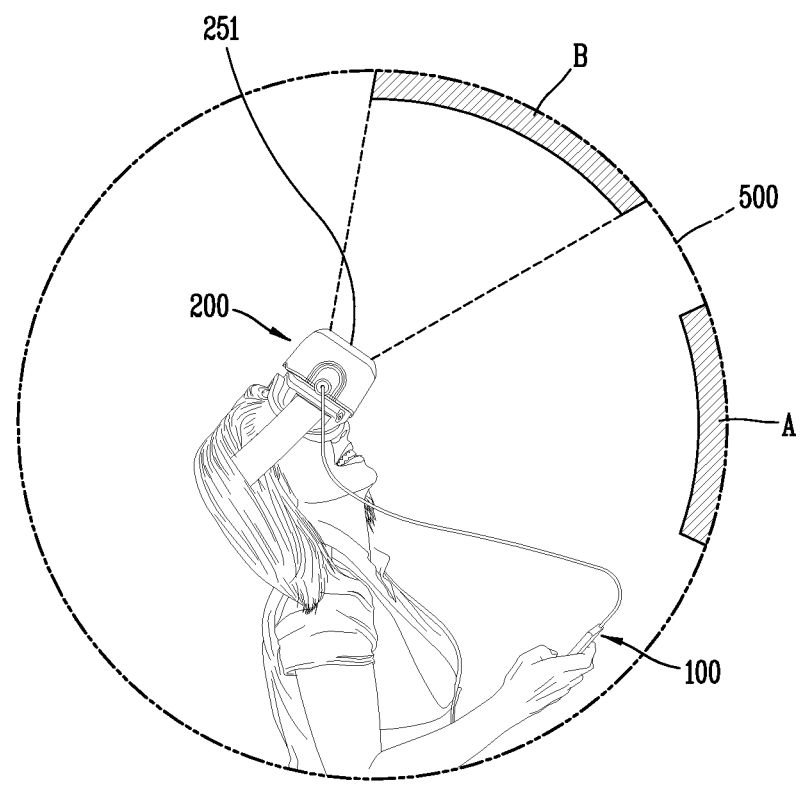
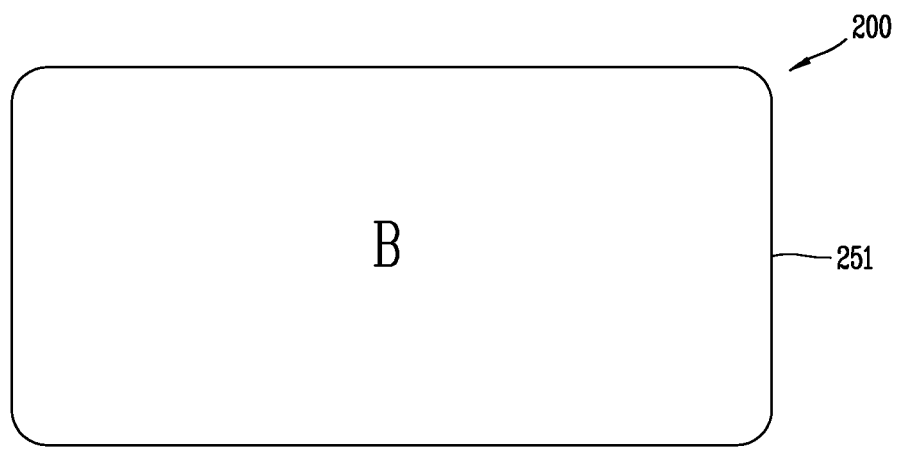

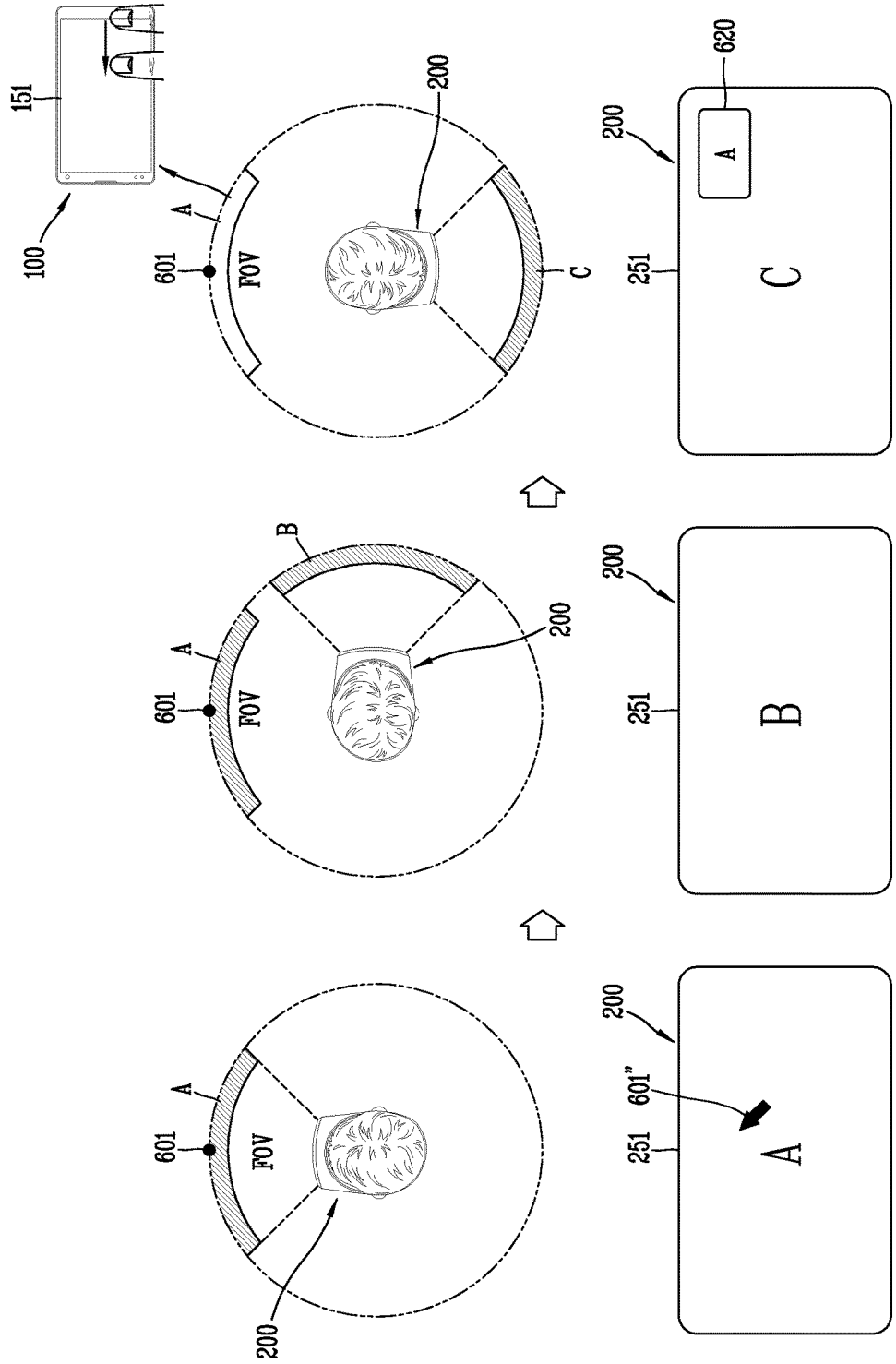

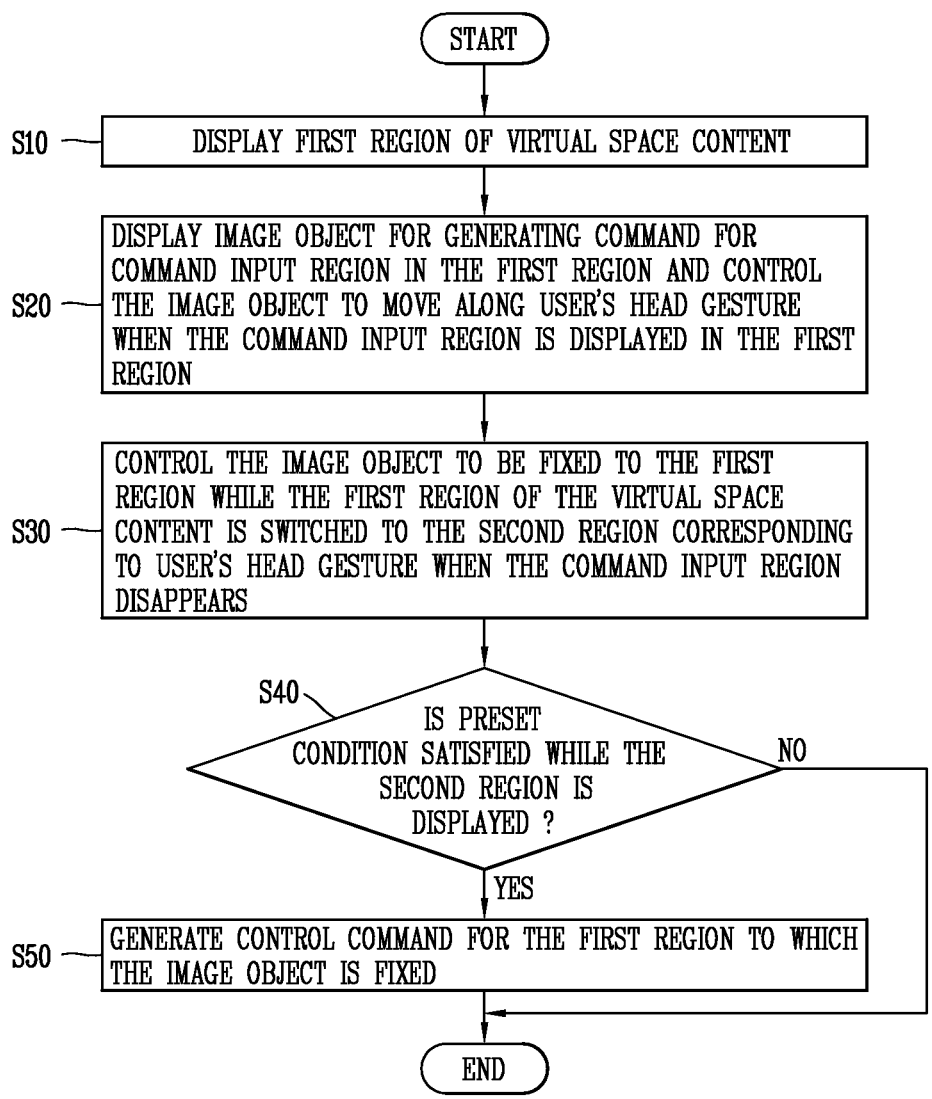

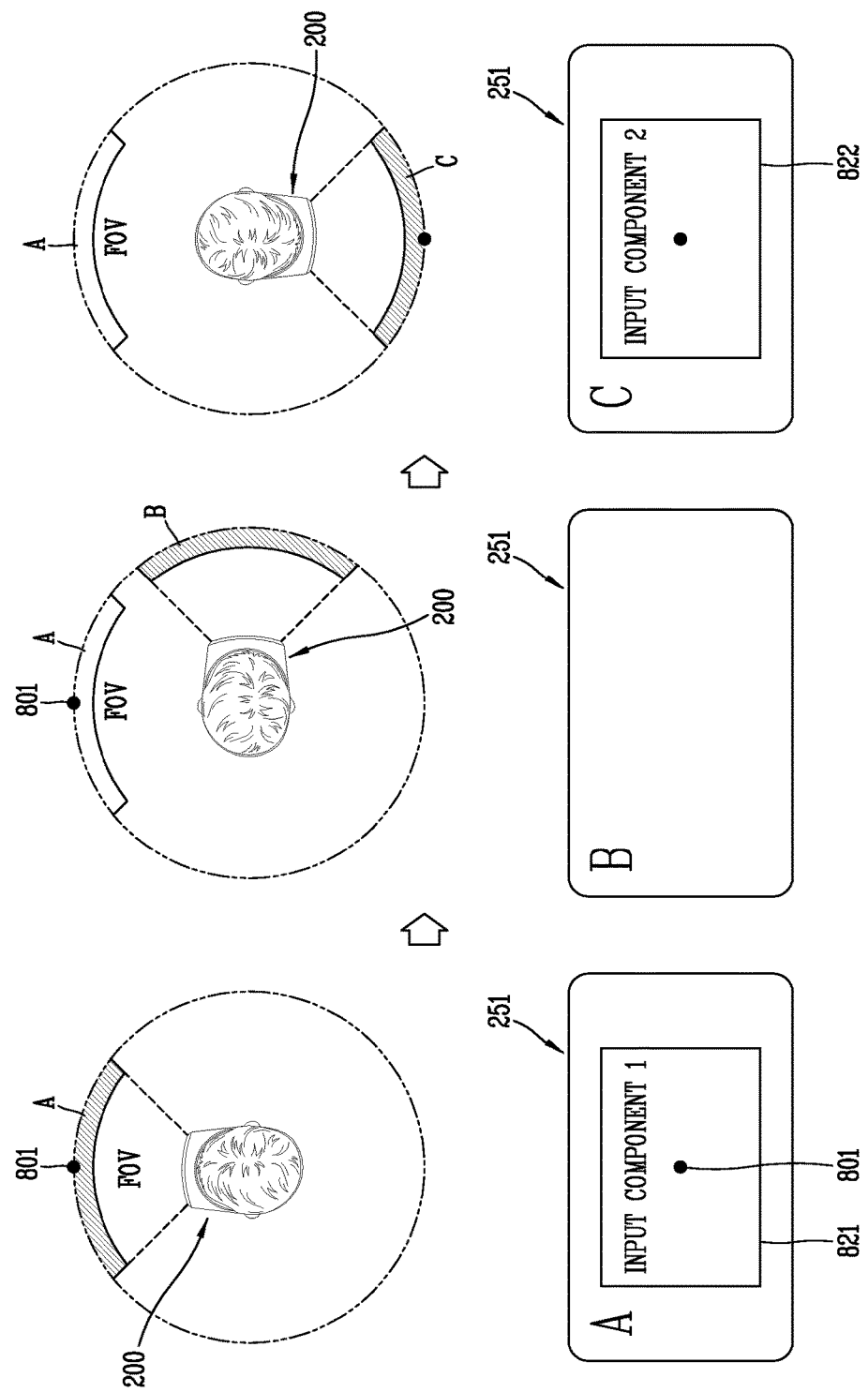

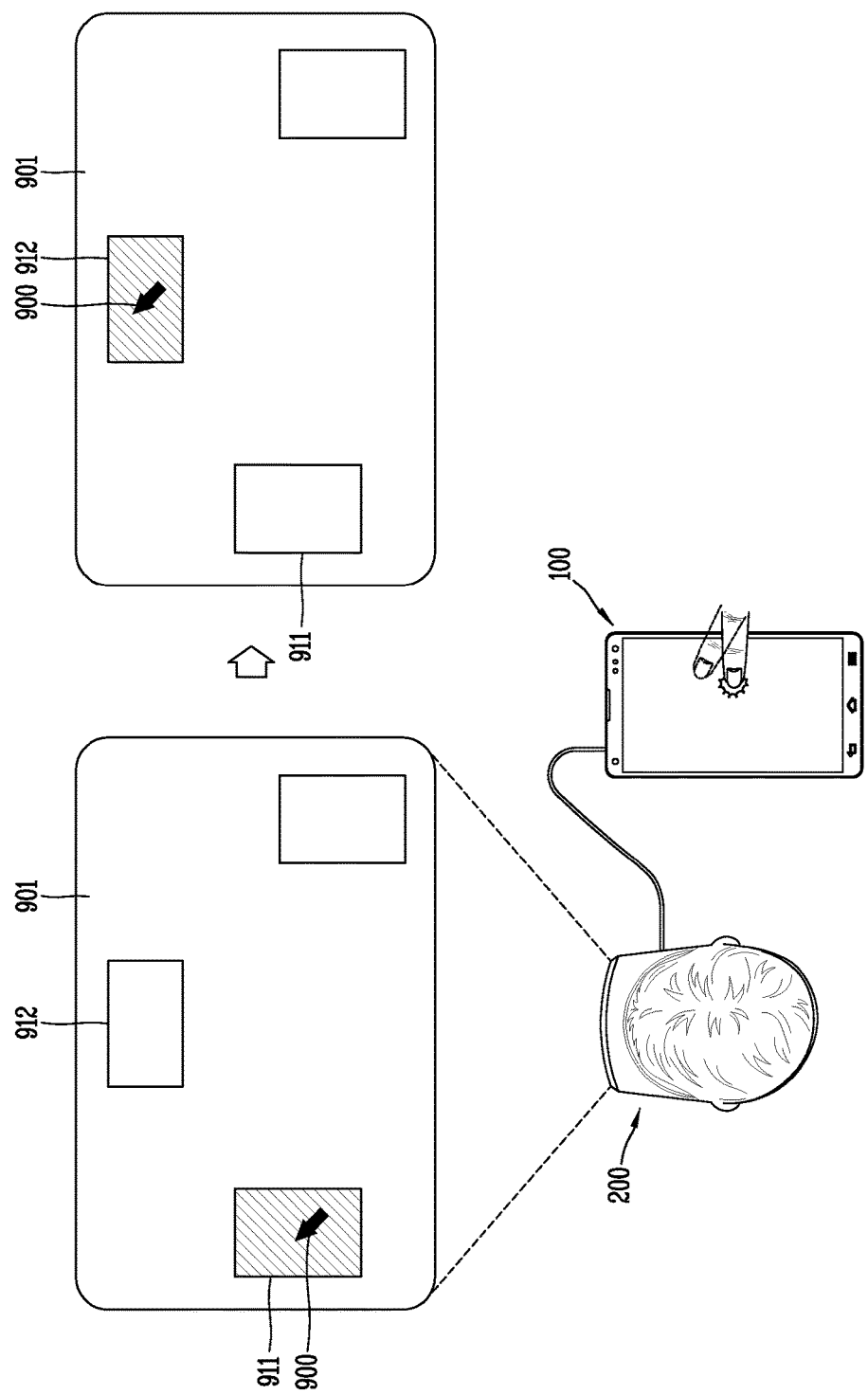

FIG. 9B
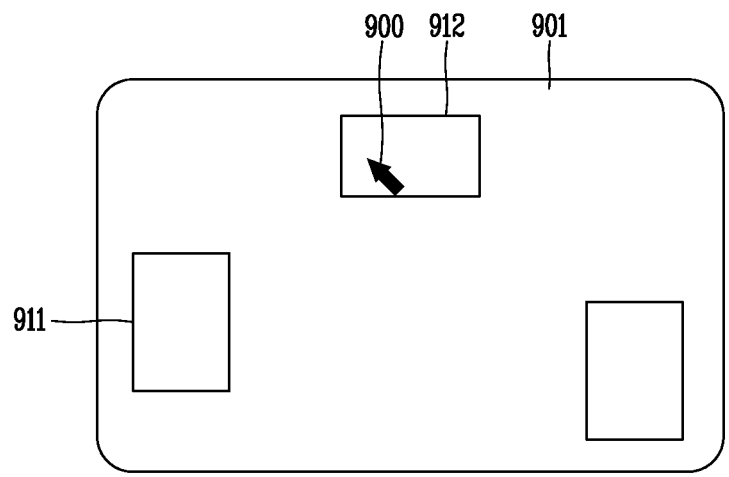
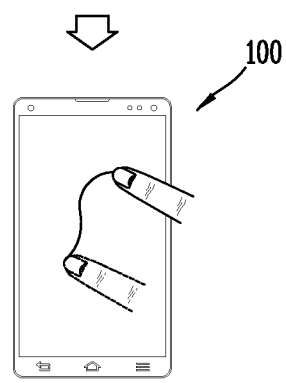
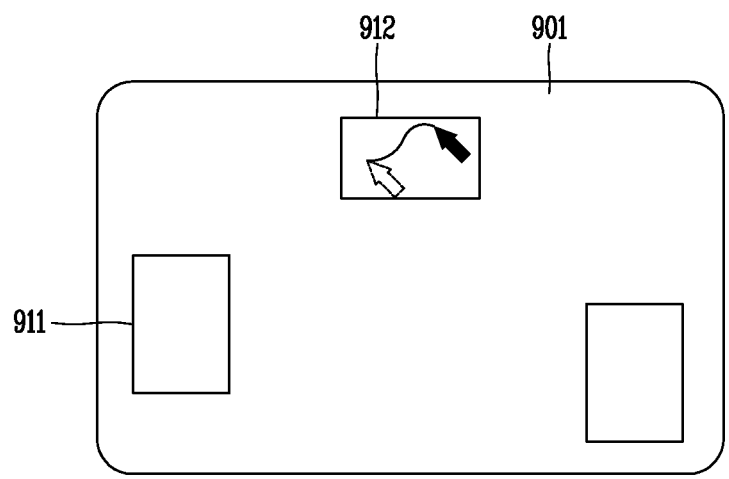

FIG. 12A
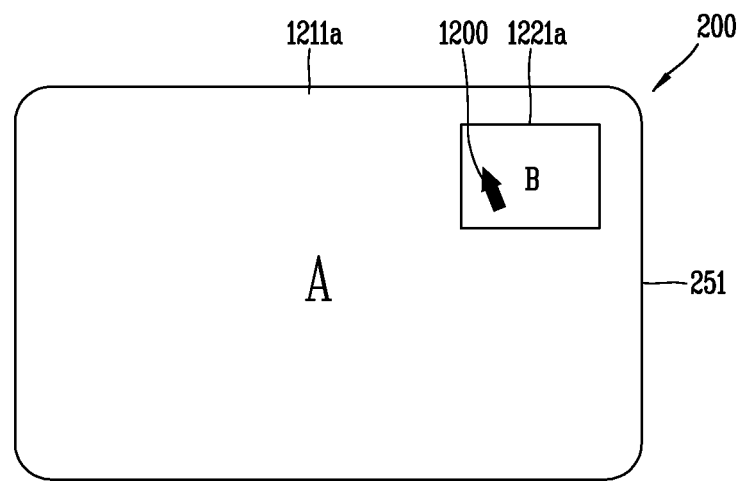
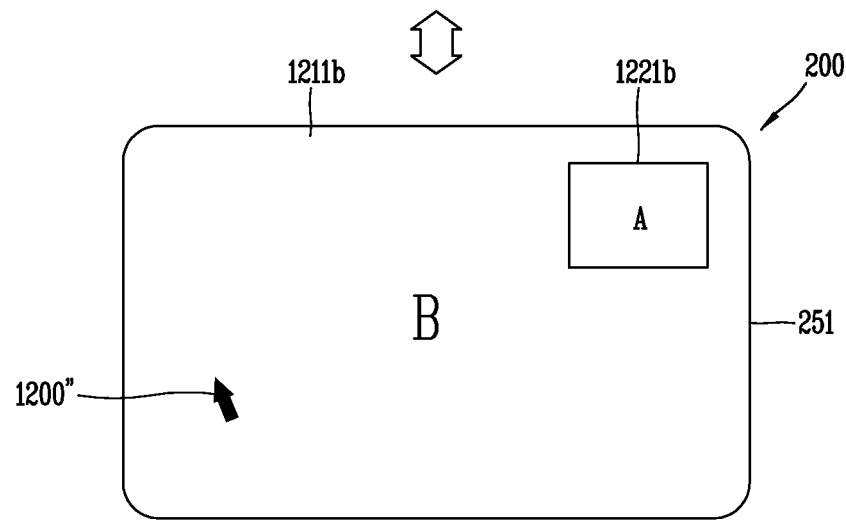

FIG. 13B
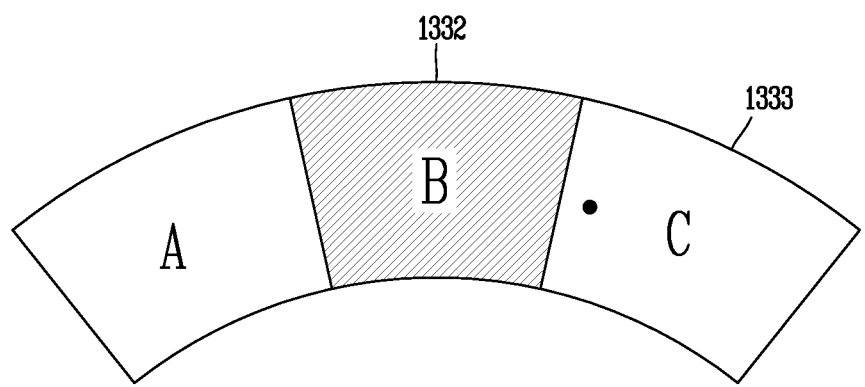
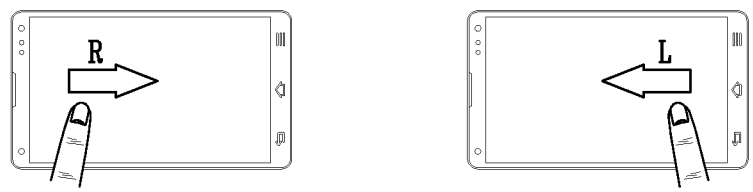
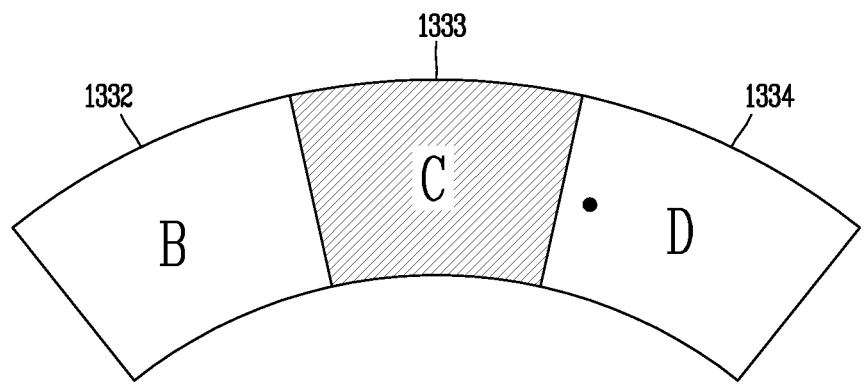

HEAD MOUNTED DISPLAY DEVICE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2016-0056539 filed on May 9, 2016, the contents of which are hereby incorporated by reference herein in its entirety.

BACKGROUND OF THE INVENTION

1. Field of the Invention

The present disclosure relates to a head mounted display (hereinafter, referred to as an "HMD") capable of communicating with a mobile terminal, and more particularly, and a control method thereof.

2. Background of the Invention

Head mounted display (HMD) may refer to a display device mounted on a user's head to directly present an image in front of the user's eyes, thereby allowing the user to enjoy image contents with a larger image than that of TV or screen or allowing the user to enjoy virtual space experiences on a virtual space screen displayed thereon.

On the other hand, a mobile/portable terminal is a terminal with mobility, and the functions of the mobile terminal have become more diversified. The examples of the functions include data and voice communications, capturing images and video via a camera, recording audio, playing music files via a speaker system, and displaying images and video on a display unit. Some terminals include additional electronic game play functions or perform a multimedia player function. In particular, recent mobile terminals may receive multicast signals for providing visual contents such as broadcasts, videos, television programs or the like.

As it becomes multifunctional, for example, such a terminal is allowed to capture still images or moving images, play music or video files, play games, receive broadcast and the like, so as to be implemented as an integrated multimedia player.

In recent years, the functions of such a mobile terminal have been more and more diversified, and accordingly, schemes for using such various functions of the mobile terminal in connection with an HMD have been actively studied.

In this manner, an HMD may be used in connection with a mobile terminal to provide a view of 360 degrees according to the movement of an HMD wearer's head. In this case, when a viewing angle provided as a front of view that is seen by a user is 100 degrees, for example, the user should move his or her head at least three or more times or continuously move his or her head in one direction to appreciate the entire view of 360 degrees.

Furthermore, even when a user temporarily checks a region out of a front of view from a view of 360 degrees or controls a region out of a front of view and then returns to a previous front of view, it has difficulties that he or she should move his or her head several times.

SUMMARY OF THE INVENTION

Accordingly, an object of the present invention is to provide an HMD device and a control method thereof capable of controlling another viewing angle region without moving his or her head from a viewing angle region currently displayed on the HMD.

Furthermore, another object of the present disclosure is to provide an HMD device and a control method thereof capable of quickly moving to a specific viewing angle region without moving his or her head from a viewing region displayed on the HMD.

To achieve these and other advantages and in accordance with the purpose of this specification, as embodied and broadly described herein, there is provided a head mounted display device, including: a communication unit configured to perform communication with a mobile terminal; a display; and a controller configured to: cause the display to display a first region of virtual space content received from the mobile terminal; cause the display to display an object in the first region, wherein the object is for generating a command for a command input region; cause the object to move according to a user's head gesture while the command input region is displayed in the first region; cause the display to display a second region of the virtual space content based on the user's head gesture when the command input region is no longer displayed such that the first region is replaced by the second region on the display, wherein the object remains in the first region when the second region is displayed; and generate a control command for the first region including the object when a preset condition is satisfied while the second region is displayed Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 4A is a block diagram for explaining a mobile terminal associated with the present disclosure;

FIGS. 5A and 5B are conceptual views for explaining a virtual space displayed on an HMD associated with the present disclosure;

FIG. 6 is conceptual views illustrating a representative embodiment of an operation method of an HMD associated with the present disclosure;

FIG. 7 is a representative flow chart for explaining an operation method of an HMD associated with the present disclosure;

FIG. 8 is a conceptual view for explaining a condition in which a pointer is shown on an HMD associated with the present disclosure;

FIGS. 9A, 9B, 9C and 10 are conceptual views for explaining examples in which a pointer and a region to which the pointer is fixed are controlled using a touch screen of a mobile terminal on an HMD associated with the present disclosure;

FIGS. 12A and 12B are conceptual views illustrating a method of displaying a region to which the pointer is fixed on a current screen region on an HMD associated with the present disclosure; and FIGS. 13A, 13B, 14A, 14B, 15, 16A and 16B are conceptual views for explaining various examples in which a control result of a region to which the pointer is fixed is applied to a current screen region using a touch screen of a mobile terminal on a head mounted display associated with the present disclosure.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to a stationary terminal such as a digital TV, a desktop computer, a digital signage and the like, excluding a case of being applicable only to the mobile terminals.

Figure 1:
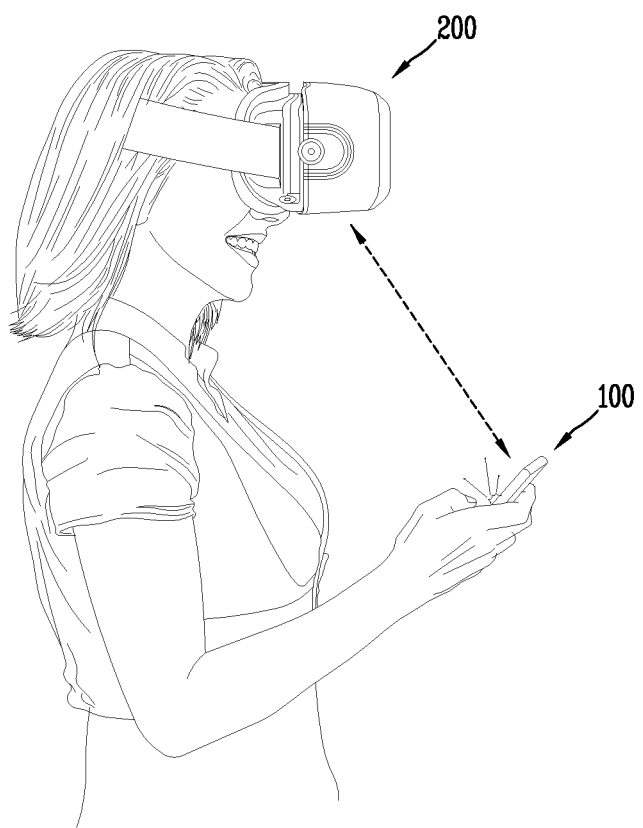
FIG. 1 is a view illustrating a scene in which an HMD associated with the present disclosure performs wireless communication with a mobile terminal.
Figure 2:
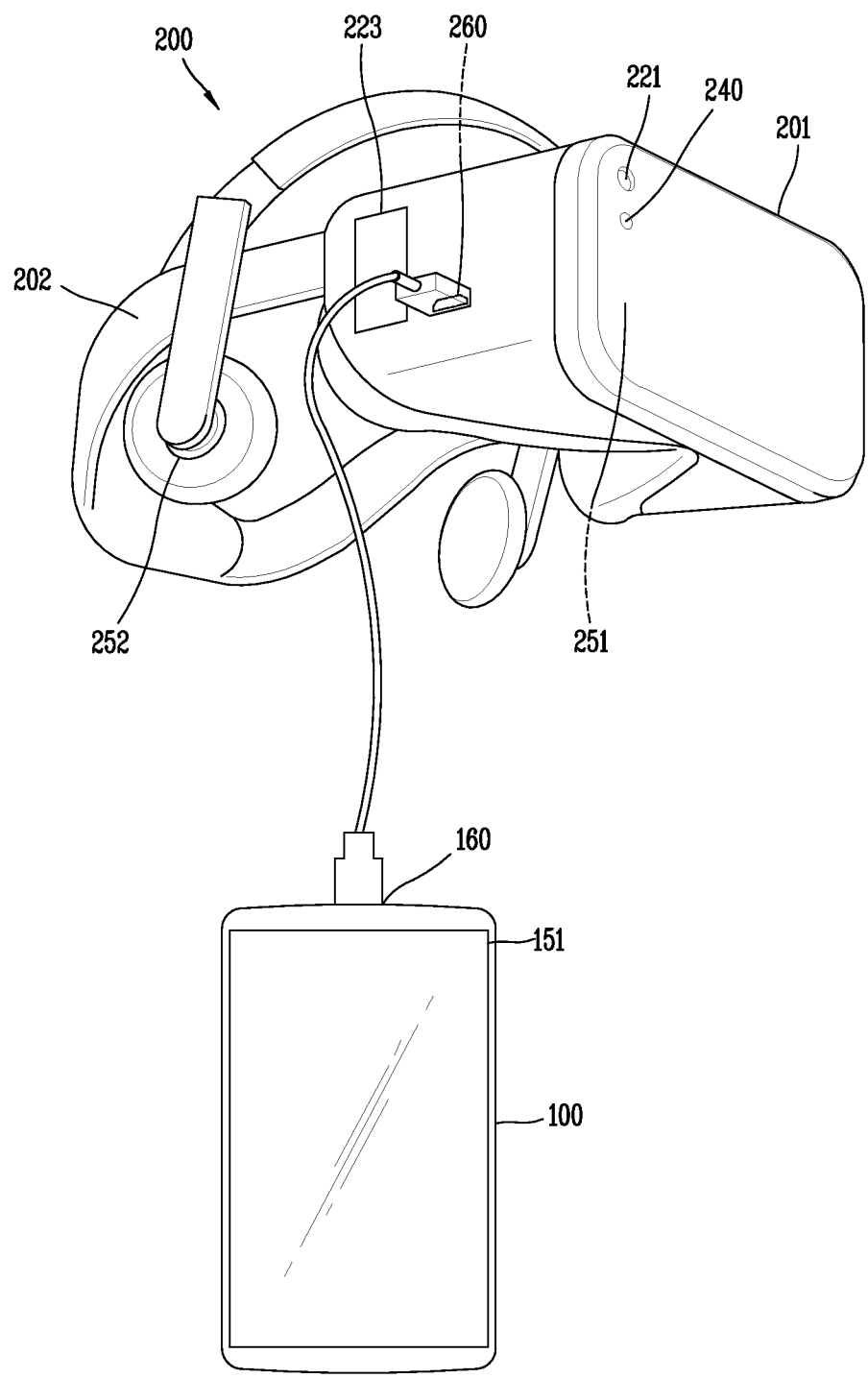
FIG. 2 is a conceptual view illustrating an embodiment in which an HMD associated with the present disclosure is connected to a mobile terminal to perform wired communication.

FIG. 1 is a view illustrating a scene in which an HMD associated with the present disclosure performs wireless communication with a mobile terminal, and FIG. 2 is a conceptual view illustrating an embodiment in which an HMD associated with the present disclosure is connected to a mobile terminal to perform wired communication.

First, referring to FIG. 1, FIG. 1 illustrates an example in which an tethering type HMD 200 connected to a mobile terminal 100 via a wireless communication.

As illustrated in FIG. 1, HMD 200 may be connected to the mobile terminal 100 in a wireless manner. The HMD 200 may receive information entered or signals sensed through the mobile terminal 100 or share various information, data or the like stored in the mobile terminal 100.

On the other hand, a virtual space image displayed on a display of the HMD 200 may be an image stored in the HMD 200 itself or stored in the mobile terminal 100 performing wireless communication with the HMD 200. For example, when it is a virtual space image stored in the HMD 200, the HMD 200 may perform image processing and rendering processing for processing an image in the virtual space, and display image information generated as a result of the image processing and rendering processing through the display. On the contrary, when it is a virtual space image stored in the mobile terminal 100, the mobile terminal 100 may perform image processing and rendering processing, and transmit image information generated as a result thereof to the HMD 200. Then, the HMD 200 may display image information received from the mobile terminal 100.

Referring to FIG. 2, the HMD 200 associated with the present disclosure may include an interface unit 260. The interface unit 260 may be provided on a first frame 201 of the HMD body 200. In FIG. 2, the HMD 200 is connected to the mobile terminal 100 through the interface unit 260 in a wired manner.

The interface unit 260 of the HMD 200 may perform the role of a path to all external devices (for example, mobile terminal 100) connected to the HMD 200. The interface unit 260 may receive data or power from an external device to transfer it to each constituent element within the HMD 200 or transmit data within the HMD 200 to an external device (mobile terminal 100). For example, a wired/wireless headset port, an external charger port, a wired/wireless data port, a memory card port, a port connected to a device provided with an identification module, an audio input/output (I/O) port, a video input/output (I/O) port, an earphone port, and the like may be included in the interface unit 260.

As illustrated in FIG. 2, the interface unit 260 of the HMD 200 and the interface unit 260 of the mobile terminal 100 may be connected through a wired cable to allow mutual communication. For an example, the interface unit 260 of the HHD and the interface unit 160 of the mobile terminal may be a wired data port. The types of the ports of each interface unit 160, 260 may be the same or different from each other.

The HMD 200 connected to the mobile terminal 100 in a wired manner may be controlled by the controller 180 of the mobile terminal 100. Furthermore, the controller of the HMD 200 may control the HMD 200 based on data (for example, control command) received from the mobile terminal 100 through a wired cable.

According to the present disclosure, for the sake of convenience of explanation, being controlled by the controller 180 of the mobile terminal 100 connected to the HMD 200 in a wired manner has been described as an example, but the present disclosure may not be necessarily limited to this, and may be also carried out by the controller of the HMD 200.

The mobile terminal 100 connected to the HMD 200 in a wired/wireless manner to allow data transmission and reception may perform the role of a controller (or control apparatus, control unit) for controlling the HMD 200.

Figure 3A:
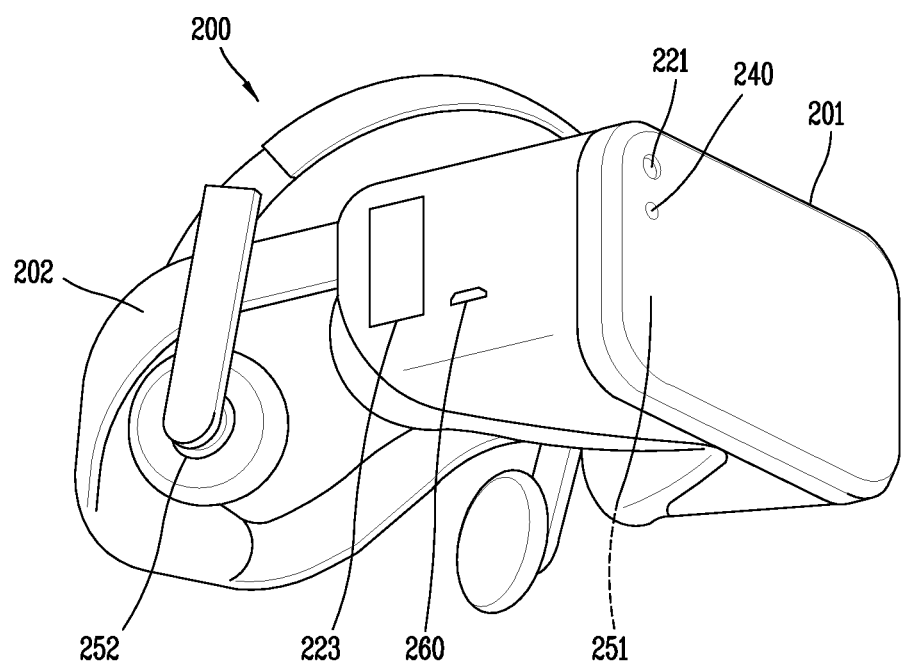
FIGS. 3A and 3B are conceptual views for explaining an HMD associated with the present disclosure.
Figure 3B:
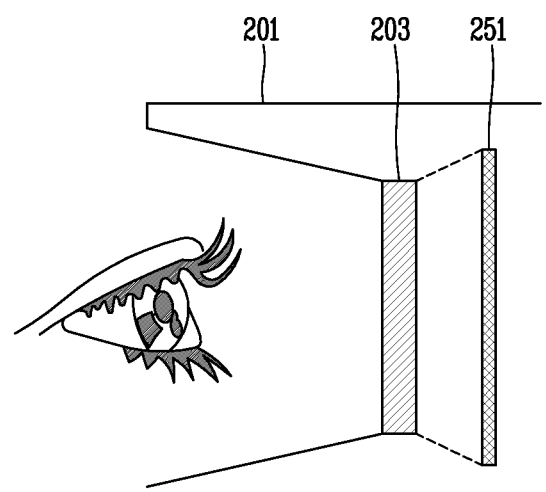

Next, FIGS. 3A and 3B are conceptual views for explaining an HMD associated with the present disclosure.

The HMD 200 associated with the present disclosure may be configured to include at least one of constituent elements that will be described below with reference to FIG. 4A.

For example, the HMD 200 may include at least one of a wireless communication unit, an input unit (for example, user input unit 223, microphone, etc.), sensing unit 240, an output unit (for example, display unit 251, audio output unit 252), an interface unit 260, a memory unit, a controller and a power supply unit. The constituent elements illustrated in FIG. 3A may not be necessarily required, and the HMD 200 described in the present disclosure may have a greater or less number of elements than those illustrated elements.

Referring to FIG. 3A, the HMD 200 associated with the present disclosure may be formed to be worn on a user's head portion (or head, face), and may include a frame unit (case, housing, cover, etc.) for the same. The frame unit may be formed of a flexible material to facilitate wearing. It is illustrated in the drawing that the frame unit includes a first frame 201 and a second frame 202 with different materials.

For an example, the first frame 201 may perform the role of providing a space in which at least one of constituent elements that will be described below with reference to FIGS. 4A-4C can be disposed, and the second frame 202 may perform the role of supporting (or fixing) the first frame 201 to be mounted on a user's (human body)'s head portion.

The frame unit may be referred to as a main body (or HMD main body) or body (or HMD body). Here, the HMD main body (or HMD body) may be regarded as at least one congregate and thus understood to have a concept referring to this. Hereinafter, the same reference numeral 200 will be used for the HMD body.

If a frame unit including the first frame 201 and second frame 202 is regarded as an HMD body, then the body of an HMD associated with the present disclosure may be formed in various shapes. Specifically, the body may include a plurality of surfaces constituting a preset angle. From such a perspective, the plurality of surfaces may denote a surface (outer surface, external surface, etc.) of the HMD 200. The plurality of surfaces may respectively have a flat or bent shape.

The body (frame unit) may be supported on a head portion, and provided with a space on which various components are mounted. As illustrated in the drawing, electronic components such as a camera 221, a display unit 251, a user input unit 223, a controller, a sensing unit 240, an interface unit 260, and the like may be mounted on the first frame 201.

An electronic component such as an audio output unit 252 or the like may be mounted on the second frame 202. However, the present disclosure may not be necessarily limited to this, and constituent elements that will be described below in FIG. 4A and constituent elements required for the HMD may be disposed in various ways on the first frame 201 and second frame 202 by a user's selection. In other words, the HMD 200 described in the present disclosure may have a greater or less number of elements than those illustrated elements.

The controller of the HMD 200 may be configured to control various electronic components provided in the HMD 200. The controller may be understood to have a configuration corresponding to the controller 180 that will be described below in FIG. 4A.

Subsequently, as illustrated in FIG. 3A, the camera 221 may be provided in the body 200. For example, the camera 221 may be disposed on one surface (for example, a front surface) of the HMD 200. The camera 221 may be disposed adjacent to at least one of the left and right eyes, and formed to capture (receive, enter) a front image. The camera 221 may be disposed adjacent to eyes to face a front side, and thus the camera 221 may acquire a scene viewed by a user as an image.

According to the drawing, it is illustrated that one camera 221 is provided therein, but present disclosure may not be necessarily limited to this. The camera 221 may be provided with a plural number to acquire a stereoscopic image.

The HMD 200 may include the sensing unit 240. The sensing unit 240 may include a proximity sensor, an illumination sensor, a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor, a microphone, a battery gauge, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.).

For an example, the controller may sense the movement of an HMD using a gyroscope sensor, a gravity sensor, a motion sensor or the like included in the sensing unit 240. For another example, the controller may sense a subject approaching the vicinity of the HMD body using an proximity sensor, an illumination sensor, a magnetic sensor, an infrared sensor, an ultrasonic sensor, an optical sensor or the like.

The HMD 200 may include the user input unit 223 manipulated by the user to receive a control command. The user input unit 223 may employ any method if it is a tactile manner allowing the user to perform manipulation with a tactile feeling such as touch, push, or the like. The drawing illustrates a view in which the user input unit 223 operable in a pushing manner and a touching manner are disposed on the frame unit.

Furthermore, the HMD 200 may include a microphone (not shown) which processes input sound into electric audio data, and an audio output unit 252 for outputting an audible sound. The audio output unit 252 may be configured to transfer the audible sound in a general audio output manner or an osteoconductive manner. When the audio output unit 252 is implemented in the osteoconductive manner, the audio output unit 252 may be closely adhered onto the head portion when the user wears the HMD 200 and vibrate the user's skull to transfer sounds.

Furthermore, as illustrated in FIG. 3B, the display unit 251 may be mounted on the frame unit to perform the role of displaying still image (for example, image, video, etc.) in front of the user's eyes. The display unit 251 may be disposed to correspond to at least one of the left and right eyes to display screen information in front of the user's eyes when the user wears the HMD 200. In other words, the display unit 251 may be formed to cover at least one of the user's left and right eyes (or to face at least one of the user's left and right eyes).

For an example, the display unit 251 of an HMD associated with the present disclosure may be located within the HMD body. Specifically, the display unit 251 may be disposed within the HMD, and disposed at a position facing the user's eyes when the user wears the HMD on the user's head portion.

Furthermore, the HMD 200 may include a lens unit 203 to allow the user to see all screen information displayed on a display unit formed within the HMD body. In other words, the HMD 200 associated with the present disclosure may be formed to transmit all screen information (or light) displayed on the display unit 251 to the user's eye balls (or field of view).

For an example, the lens unit 203 may be disposed to correspond to at least one of the user's both eyes (i.e., left and right eyes). Furthermore, the lens unit 203 may be disposed to be placed between the user's eye balls and the display unit 251.

The lens unit 203 may have a varying viewing angle according to a distance between the user's eye balls and the display unit, and thus the position thereof may be formed to vary by the user's control. Furthermore, the lens unit 203 may be formed through a concave lens, a convex lens or a combination thereof.

Furthermore, the display unit 251 may project an image to the user's eyes using a prism. Furthermore, the prism may be formed a transparent material to allow the user to view the projected image and a general field of view at the same time.

As described above, an image displayed through the display unit 251 may be seen to overlap with a general field of view. The HMD 200 may provide augmented reality (AR) in which a virtual image overlaps with an image or background of reality using the characteristics of the display to show one image.

In other words, the display unit 251 may be formed not to allow external light to pass therethrough to implement virtual reality (VR) or formed to allow external light to pass therethrough to implement augmented reality (AR).

Furthermore, though not shown in the drawing, the display unit 151 configured to cover at least one of the left and right eyes may be detachably mounted on the frame unit.

Furthermore, the display unit 251 may be a display unit of an external mobile terminal. The HMD body 200 (frame unit) may be formed to allow an external mobile terminal to be detachable, and electrically connected to the external mobile terminal. When electrically connected to the external mobile terminal 100, the controller of the HMD may control the external mobile terminal.

If when the external mobile terminal is mounted on the HMD body 200, then the foregoing configuration of the camera 221, sensing unit 240, display unit 251, and the like of the HMD 200 may be replaced with the configuration of the camera, sensing unit, display unit and controller provided in the external mobile terminal.

However, according to the present disclosure, a case where the HMD 200 itself is provided with the display unit 251 other than a case where the external mobile terminal is mounted on the HMD body 200 will be described as an example to implement light weight.

Hereinafter, constituent elements provided in the body of the HMD will be described in more detail.

Of the foregoing constituent elements, the wireless communication unit may include at least one module capable of performing wireless communication between the HMD 200 and a wireless communication system, between the HMD 200 and another HMD 200, between the HMD 200 and a mobile terminal (or stationary terminal), between the HMD 200 and a control apparatus, between the HMD 200 and a camera installed at an outside thereof to perform wireless communication or between the HMD 200 and an external server.

Furthermore, the wireless communication unit may include at least one module connecting the HMD 200 to one or more networks.

The wireless communication unit may include at least one of a broadcast receiving module, a mobile communication module, a wireless internet module, a short-range communication module, and a location information module. Those modules may be analogically applicable in the same/similar manner to the content of a wireless communication unit that will be described below in FIG. 4A.

However, the present disclosure may not be necessarily limited to this, and the mobile terminal 100 and HMD 200 associated with the present disclosure may transmit and receive data to and from each other in a wired communication manner through the interface unit 160 of the mobile terminal 100 and the interface unit 260 of the HMD 200 as described above.

Figure 4B:
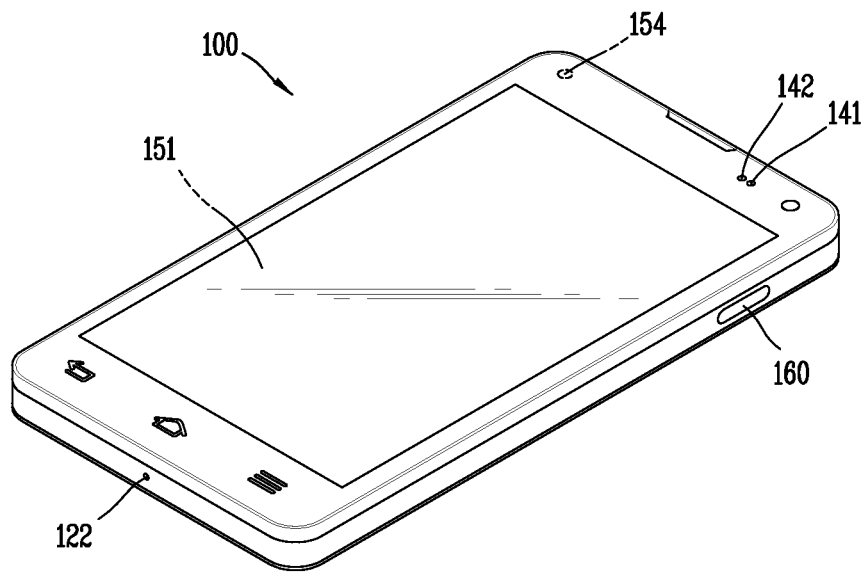
FIGS. 4B and 4C are conceptual views in which an example of a mobile terminal associated with the present disclosure is seen from different directions.
Figure 4C:
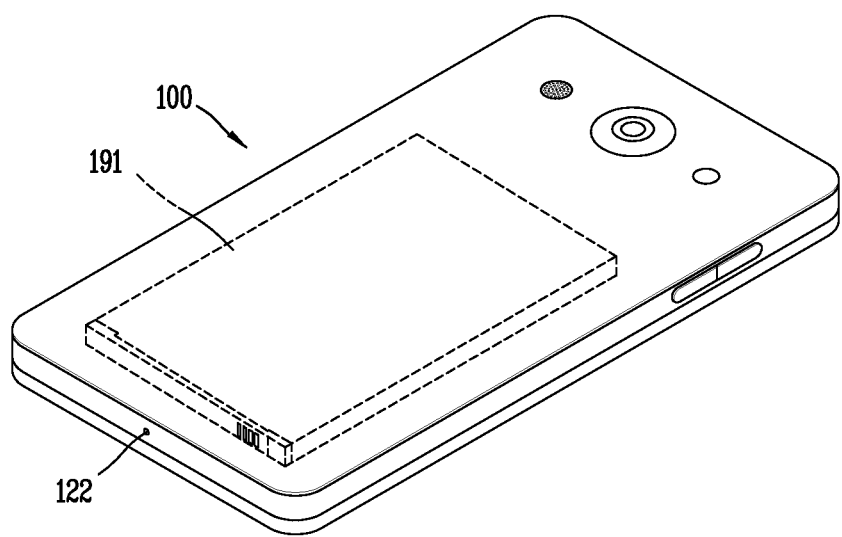

Next, FIG. 4A is a block diagram for explaining the mobile terminal 100 connected to the HMD 200 associated with the present disclosure. Furthermore, FIGS. 4B and 4C are conceptual views in which an example of the mobile terminal 100 associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 4A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

Furthermore, when the display unit 151 is implemented as a touch screen, the present disclosure may include a touch sensor constituting an interlayer structure or integrally formed with the display unit 151.

The touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separated from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

On the other hand, the touch sensor may be formed to sense a touch input using a different scheme in an active or inactive state of the display unit 151. At this time, the different scheme may be associated with an active period of the touch sensor. More specifically, the touch sensor may be activated with a different period according to whether or not the display unit 151 is activated. In other words, the touch sensor may have a different active period according to whether or not the display unit 151 is activated to sense a touch input applied to the touch sensor.

For example, when the display unit 151 is in an inactive state, the touch sensor may be activated with a preset specific period. In this case, the specific period may be a period corresponding to a time greater than zero. Furthermore, when the display unit 151 is in an active state, the touch sensor may be always operated in an active state. In other words, in this case, an activated period of the touch sensor may be a period having a time zero or very close to zero.

Whether or not the touch sensor is activated may be determined using the power consumption of the touch sensor. For example, the touch sensor may correspond to an inactive state when the power consumption of the touch sensor is less than a preset reference value based on zero, and may be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor may be activated for each a preset specific period.

On the other hand, as reducing a specific period in which the touch sensor is activated, a speed for sensing a touch input hitting the display unit 151 may increase, but accordingly power consumed by the touch sensor may also increase. On the contrary, as increasing the period in which the touch sensor is activated, a speed for sensing a touch input hitting the display unit 151 may decrease though power consumed by the touch sensor decreases.

Accordingly, the specific period may be set to enhance the efficiency of power consumption while the sensing speed is fast enough to the extent that cannot be recognized by the user in sensing a touch input hitting the display unit 151. For example, the specific period may be set such that the touch sensor is inactive and then active 20 times (Hz) per second.

On the other hand, while the display unit 151 is in an active state, the touch sensor may be also activated, and the active period (T) in an active state may be zero or very close to zero. Otherwise, the period of the touch sensor while the touch sensor is in an active state may be shorter several times than a specific period set to activate the touch sensor while the display unit 151 is in an inactive state.

On the other hand, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 may switch the doze mode to an active mode in which the display unit and touch sensor are activated.

In addition, the touch sensor may be driven with a different period based on the state of the display unit 151. For example, the touch sensor may execute a doze mode when the display unit 151 is in a closed state, and execute an active mode when switching from the closed state to an open state.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Next, FIGS. 5A and 5B are conceptual views for explaining a virtual space associated with the present disclosure.

A virtual space 500 (or virtual space image) associated with the present disclosure may denote a 3D image formed in all directions (for example, 360 degrees) based on a user who wears the HMD 200 as described above. Furthermore, the virtual space 500 may denote a stereoscopic space image (or stereoscopic image, 3D image) rendered to recognize that the user who wears the HMD 200 exists in a specific space (or virtual space). Furthermore, virtual space content, as content formed with such a 3D image or stereoscopic space image, may denote one in which a program for performing a function such as web browser, video playback, schedule management, calls, games, music, documentation, messages, banking, e-books, traffic information, application update, or the like is formed with a 3D image or stereoscopic space image.

When virtual space content is received from the mobile terminal 100, one region (for example, first region (A)) of the virtual space content 500 may be displayed on the display unit 251 of the HMD 200 as illustrated in FIG. 5A. To this end, the controller may transmit a transmission request of virtual space content to the mobile terminal 100.

Here, the first region may be a default region displayed as a default when a virtual space content is displayed on the display unit 251 of the HMD 200, a region including a specific object among objects included in the virtual space or a specific region set by a user. Furthermore, the specific object may be an object set by a user (or set by default) among at least one graphic objects included in a virtual space. Furthermore, when the virtual space content has been previously displayed and then displayed again on the display unit 251 of the HMD 200, the first region may be one region displayed at an end time point of the virtual space that has been previously displayed on the HMD 200.

On the other hand, one region (A) of virtual space content displayed on the display unit 251 of the HMD 200 may be changed based on the movement of a user who wears the HMD 200 or the resultant movement of the HMD 200. To this end, when there is a head gesture of the user who wears the HMD 200, the sensing unit 240 of the HMD 200 may sense the movement (including movement amount and direction). Furthermore, the movement may be carried out in a state that one region (A) of virtual space content is displayed on the display unit 251 of the HMD 200. Furthermore, here, the movement should be understood as a concept including all the movement, rotation of a user who wears the HMD 200 or a combination thereof or the resultant movement, rotation of the HMD 200, or a combination thereof.

Then, the sensing unit 240 (or controller of the HMD) transfers information associated with the movement to the controller of the HMD 200 (or the controller 180 of the mobile terminal 100). Then, the controller (or controller 180) may control the display unit 251 of the HMD 200 to display a region (B) different from the displayed one region (A) based on information associated with the transferred movement.

For example, as illustrated in FIG. 5B, when the HMD body 200 moves (or rotates) according to a user's head gesture in a state that one region (A) of the virtual space (A) is being displayed on the display unit 251, the controller 180 of the mobile terminal 100 may display a region (B) different from the one region (B) on the virtual space 500 based on the movement as illustrated in FIG. 5B.

Through the foregoing configuration, the present disclosure may provide a user interface capable of allowing a user who uses the HMD 200 to receive the feeling of actually moving in a virtual space.

Furthermore, the HMD 200 configured to include at least one of the foregoing constituent elements may include a communication unit (interface unit 260 or wireless communication unit) for performing wired/wireless communication with the mobile terminal 100 connected thereto, and display a first region of virtual space content received from the mobile terminal 100 through the communication unit 210.

At this time, a command input region is displayed in the displayed first region, the controller of the HMD 200 may display an image object for generating a command to the command input region, and control the image object to move along the user's head gesture.

Here, the command input region may denote a region including one or more input components, and capable of entering a control command or text or selecting a function through one or more input components. For example, the command input region may include a soft key, a menu key, a keypad, a touch keyboard, a select window, a task pane including a control menu, and the like.

Furthermore, here, the image object may denote a point, a cursor, an arrow, a prompt, and another image with a preset shape that moves in response to a user's head gesture sensed through the sensing unit 240 of the HMD 200 or the resultant movement direction and movement amount of the body of the HMD 200. To this end the controller (or the controller 180 of the mobile terminal 100) may apply and display the movement direction and movement amount sensed through the sensing unit 240 on the image object in real time. Furthermore, according to an example, the direction and movement amount of a user's line of sight traced through the camera 221 may be applied and displayed on the image object in real time.

As described above, the image object may be displayed along a user's head gesture, the resultant movement of the body or a signal corresponding to a change of a user's line of sight, and thus hereinafter, the image object will be commonly referred to as a "pointer".

On the other hand, when a command input region disappears from the display unit 251, the controller may fix an image object (or pointer) to a first region while switching the first region of the virtual space content to a second region corresponding to a user's head gesture.

Here, an image object being fixed to a first region may denote an image object being displayed at a specific position without any movement even when a user's head gesture, the resultant movement of the body or a change of a user's line of sight is sensed.

Alternatively, an image object being fixed to a first region may denote an image object disappearing without moving along a user's head gesture, the resultant movement of the body or a change of a user's line of sight. Alternatively, an image object being fixed to a first region may denote an image object appearing again at a position that has been previously displayed prior to disappearing when the image object is displayed again.

Furthermore, an image object being fixed to a first region may denote allowing the controller to memorize a position of the first region to which the image object is fixed and a position of the image object in the first region even when the first region is no longer displayed on the display unit 251 as the first region is switched to the second region.

As described above, when a preset condition is satisfied in a state that a second region is displayed on the display unit 251, for example, when a predetermined input is received or one or more input elements are shown on the display unit 251, the controller may generate a control command for the first region to which the image object is fixed. In other words, a user may control an invisible specific region while continuously viewing a screen region displayed on the display unit 251 without moving his or her head.

Hereinafter, FIG. 6 is conceptual views illustrating a representative embodiment of an operation method of an HMD associated with the present disclosure.

First, a first region (A) may be displayed in a front of view (FOV) of virtual space content received from the mobile terminal 100 on the display unit 251 of the HMD 200. Here, in order to control at least one input component in the first region (A), an image object, namely, pointer 601", moving along a user's head movement, the resultant movement of the body of the HMD 200 or a change of a user's line of sight may be displayed.

In this state, when an input component disappears on the display unit 251 as another region of virtual space content, for example, second region (B), is shown according to a user's head gesture, the pointer 601" is continuously fixed to the first region (A). More specifically, the pointer 601" may be fixed to one point of the input component of the first region (A). Accordingly, as illustrated in FIG. 6, the pointer may not be displayed in the second region (B) displayed on the display unit 251. Furthermore, subsequently, a third region (C) of virtual space content may be displayed along the direction of the user's head movement.

In this state, when a wireless signal corresponding to a preset touch gesture applied to the touch screen 151 of the mobile terminal 100 connected to the HMD 200, for example, is received as an input signal satisfying a preset condition, part of the first region (A) to which the pointer is fixed may be shown on the display unit 251. Here, a preset touch gesture may be a touch gesture in which a touch input applied to an edge of the touch screen 251, for example, is dragged in an inward direction of the edge.

Accordingly, as illustrated in FIG. 6, at least part of the first region (A) to which the pointer is fixed may be displayed in a PIP format while maintaining the display status of the third region (C) (620). Here, though not shown in the drawing, a pointer or modified pointer image may be displayed at the same time on the part (620) of the first region (A) displayed in a PIP format. Accordingly, it may be possible to implement screen control within the relevant region (620).

Consequently, a user may immediately check another region of virtual reality content, particularly, a previous region that has been indicated by the pointer, on a current screen without moving his or her head. In other words, it may provide convenience capable of allowing the user to control an invisible region at a current position.

Next, FIG. 7 is a representative flow chart for explaining an operation method of an HMD associated with the present disclosure.

First, the process of displaying a first region of virtual space content on the display unit 251 of the HMD 200 is disclosed (S10). Here, the type of virtual space content may not be limited in any way, and may include all contents in which a program for performing a function such as, home screen, web browser, video playback, schedule management, calls, games, music, documentation, messages, banking, e-books, traffic information, application update, or the like is formed with a 3D image or stereoscopic space image.

Furthermore, the content of virtual space content may be one received from the mobile terminal 100, one stored in the HMD 200 or one received from an external server (not shown) connected to the HMD 200.

When a command input region is displayed in the displayed first region, an image object, namely, pointer, for generating a command to the command input region, is displayed in the first region. Then, the controller moves the pointer along a user's head gesture (or the movement of the HMD 200 or a user's line of sight) (S20). Here, the command input region may denote one or more input components as described above, and denote a region including one or more input components, and capable of entering a control command or text or selecting a function through one or more input components. For example, the command input region may include a soft key, a menu key, a keypad, a touch keyboard, a select window, a task pane including a control menu, and the like. In this case, when an input component is pointed using the pointer, a control command corresponding to the relevant input component is generated.

Then, when the command input region disappears, the controller controls the image object to be fixed to the first region while the first region of the virtual space content is switched to the second region corresponding to the user's head gesture (S30).

Here, the second region may denote another region of virtual space content determined movement information corresponding to a user's head gesture. Furthermore, the movement information may include the movement direction, movement amount, and movement speed of the head gesture. The movement may be sensed through the sensing unit 240 (or the sensing unit 140 of the mobile terminal 100). Furthermore, as a movement associated with a function of displaying the second region on the display unit 251, the movement may include various types of movements. For example, the various types of movements may include all movements such as a movement in which the terminal body moves by a predetermined distance and then returns, a movement of shaking at a predetermined frequency, a movement in which the body of the terminal rotates by a specific angle (for example, reversing movement), a movement in which the terminal body rotates by a predetermined angle and then returns, a movement of moving in a specific direction, and the like. Furthermore, according to another embodiment, a movement corresponding to a user's line of sight through the camera 221 may be used instead of a user's head movement or a movement of the body of the HMD 200. In this case, the foregoing pointer may be controlled to move along a user's line of sight.

Next, the controller may determine whether or not a preset condition is satisfied in a state that the second region is displayed on the display unit 251 (S40), and generate a control command for the first region to which the image object is fixed, namely, an invisible region, according to a result of the determination (S50).

Here, the control command for an invisible region may be implemented in various ways according to a preset condition. For example, the control command may be any one of a control command for displaying a region to which the pointer is fixed on a current screen, a control command for bringing the pointer onto a current screen, a control command associated with a current screen, and a control command for executing, processing, ending a specific task in a region to which the pointer is fixed. A specific embodiment of the generation and execution result of the control command will be described in more detail with reference to the accompanying drawings.

FIG. 8 illustrates an exemplary condition in which a pointer fixed to an invisible region is redisplayed on a currently displayed screen in association with the step S20 in FIG. 7.

When the first region (A) of the virtual space content displayed on the display unit 251 of the HMD 200 is switched to the second region (B) according to a user's head gesture, and a command input region does not exist in the second region (B), the pointer 801 does not follow the user's head gesture but is fixed to the command input region 821 of the first region (A). Accordingly, the user may appreciate content corresponding to the second region (B) without disturbance according to the movement of the pointer.

Subsequently, when the second region (B) of the virtual space content is switched to a third region (C) including another control command according to a user's head gesture, the pointer 801 that has been fixed to the command input region 821 of the first region (A) may be separated and displayed in the command input region 822 included in the third region (C).

In other words, when an input component is shown in another region of a virtual space shown according to a user's head gesture, a pointer that has been left in a previous region is moved and displayed in a currently displayed region. Due to this, it has an advantage capable of immediately pointing and controlling the input component shown in a current screen region using the pointer.

Next, as illustrated in FIG. 9A, when a first signal corresponding to a first touch input applied to the touch screen 151 of the mobile terminal 100 connected thereto is received in a state that the pointer 900 is displayed in the command input region 911 of the second region 901 displayed on the display unit 251, the controller (or controller 180) may move the pointer displayed in the command input region 911 to a very next command input region. Here, the first touch input may be a plurality of taps applied to one point of the touch screen 151 of the mobile terminal 100.

As a result, the pointer 900 is displayed at one point of the next command input region 912 within the second region 901, for example, at the center of the next command input region 912.

Here, the next command input region may denote another input component located within the second region as illustrated in FIG. 9A or an input component located in another region of the virtual space content though not shown in the drawing.

In case of the latter, the second region 901 displayed on the display unit 251 may be switched to another region.

Specifically, the controller (or controller 180) may switch the second region displayed on the display unit 251 to another region including a next command input region indicated by a pointer in response to the pointer (or modified pointer) that has been moved to the next command input region according to a plurality of taps applied to the foregoing touch screen 151.

Figure 9C:
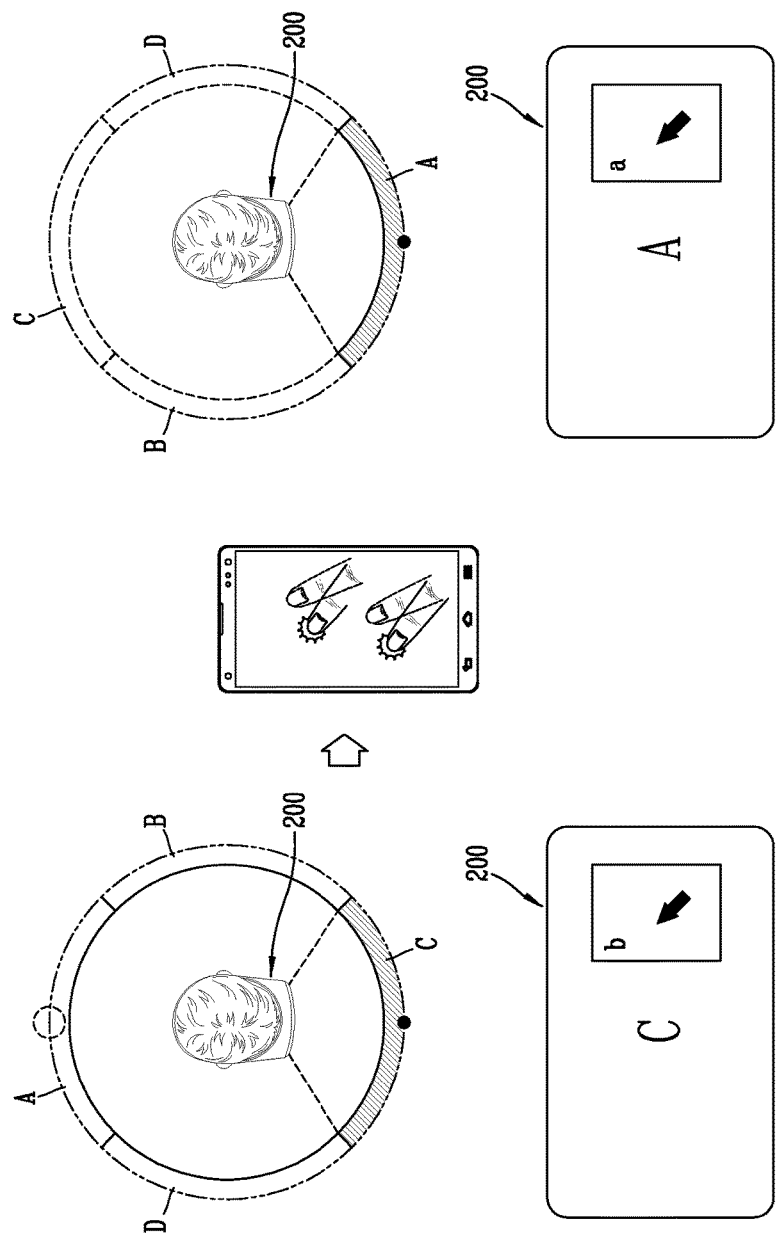

For example, in FIG. 9C, when the next command input region exists in the first region (A) that has been previously displayed, the current screen region (C) displayed on the display unit 251 is switched to the first region (A) that has been previously displayed without any movement of the user's head. In other words, the display of an invisible region may be controlled using the pointer. For an example, when the user moves his or her head to control a task pane ("b") popped up in another region (C), and then applies taps to the touch screen 151 of the mobile terminal 100 in a state that the pointer is fixed to a sound playback task pane ("a") popped up in the first region (A), the current screen region (C) may be immediately switched to the first region (A) displayed with the sound playback task pane ("a"). When the screen region is switched as described above, the pointer that has been displayed on the task pane ("b") is shown at one point of the task pane ("a").

Furthermore, though not shown in the drawing, when a current screen region is switched to a screen region including a next command input region as taps are applied to the touch screen 151, screen regions may be shown in the order of "C", "D" and "A" or "C, "B" and "A". It provides an effect in which the user seems to move his or her head.

Furthermore, though not shown in the drawing, when the pointer jumps in the unit of command input regions (or input component units within the same command input region), the shape of the pointer may be modified. For example, it may be modified to a select display such as a focusing effect or the like in the next command input region 912.

On the other hand, in order to perform an actual input to a desired command input region or a specific input component within the command input region as described above, the position of the pointer should be controlled in more detail in the relevant region.

For example, when a signal corresponding to a drag touch input exceeding a reference pressure applied to the touch screen 151 of the mobile terminal 100 is received in a state that the command input region next command input region 912 desired to input a command using the pointer is selected as illustrated in FIG. 9B, the controller may move the pointer within the selected command input region along the movement path of the drag touch input. For example, as illustrated in FIG. 9B, the pointer moves to a specific position while moving along a dragged path on the touch screen 151 of the mobile terminal 100. Then, a touch amount of the drag touch input applied to the touch screen 151 may be varied to select and control a specific input component. For example, it may be possible to execute a specific function or adjust a progress bar or the like in the command input region 912.

According to the foregoing embodiment, the pointer may be controlled to move in the unit of command input regions of the virtual space content, thereby allowing the user to quickly access a specific region of the virtual space content without moving his or her head.

On the other hand, when the pointer is fixed to another invisible region in a virtual space out of a current screen region as described above, it may be possible to separate and call only the pointer. Such an example is illustrated in FIG. 10.

Figure 10:
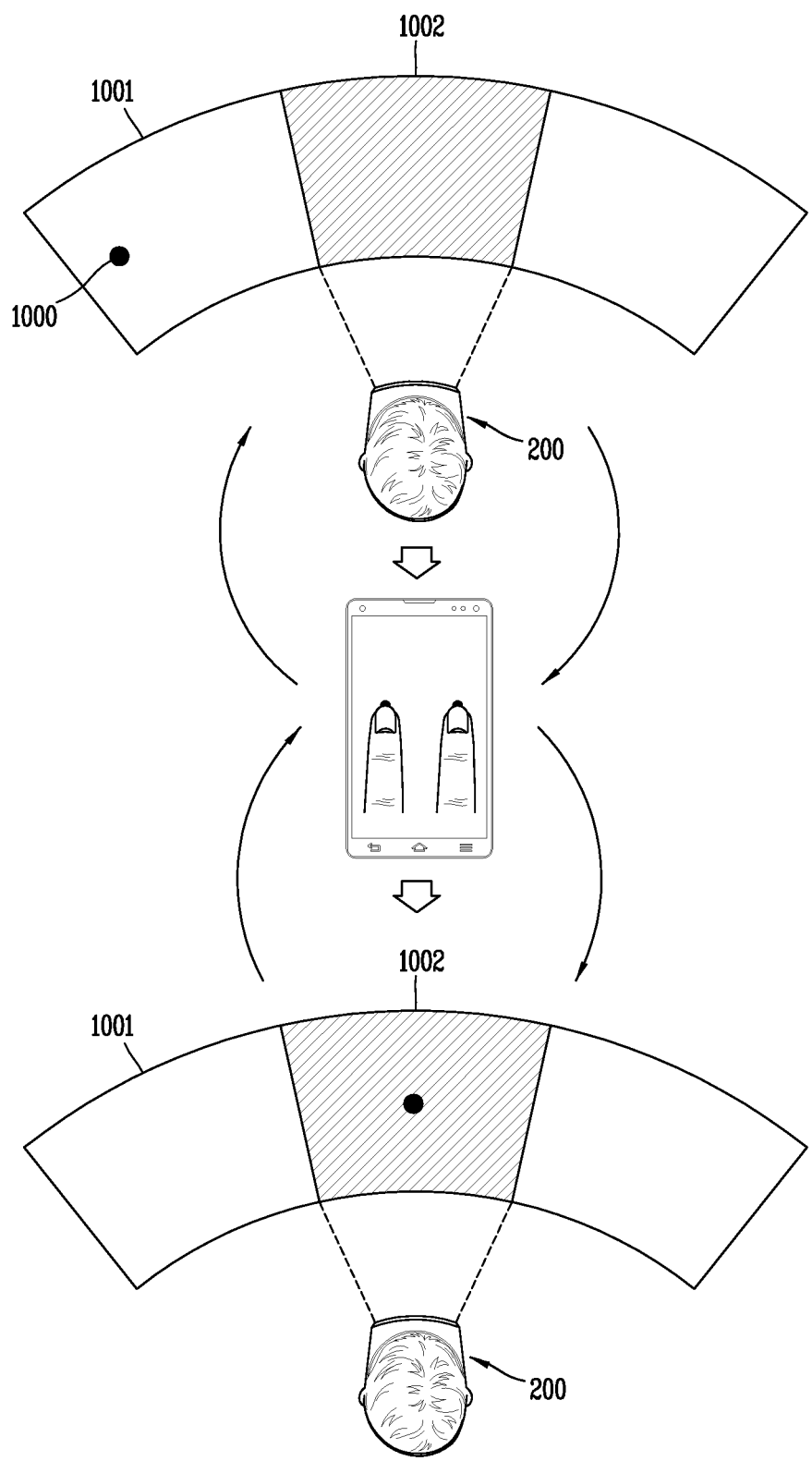

In FIG. 10, in case where the pointer 1000 is fixed to the first region 1001 of the virtual space content, and the user views the second region 1002 of the virtual space content, when a preset touch gesture applied to the touch screen 151 of the mobile terminal 100 connected thereto, for example, a wireless signal corresponding to a plurality of taps applied to any two points of the touch screen 151, is received, the controller may display the pointer that has been displayed in an invisible region at one point of the current screen region 1002. Here, the one point may be the center of the current screen region 1002 or a point located with a specific object, for example. Accordingly, the pointer located out of the user's field of view may be quickly brought into his or her field of view to control a current screen.

On the other hand, though not shown in the drawing, when a wireless signal corresponding to a plurality of taps applied to any two points on the touch screen 151 of the mobile terminal 100 is received again through the communication unit, the pointer returns again to the previous region 1001 located out of the field of view. To this end, the controller (or controller 180) may temporarily store a coordinate for a previous location when calling the pointer located out of the field of view to a current screen region.

Figure 11A:
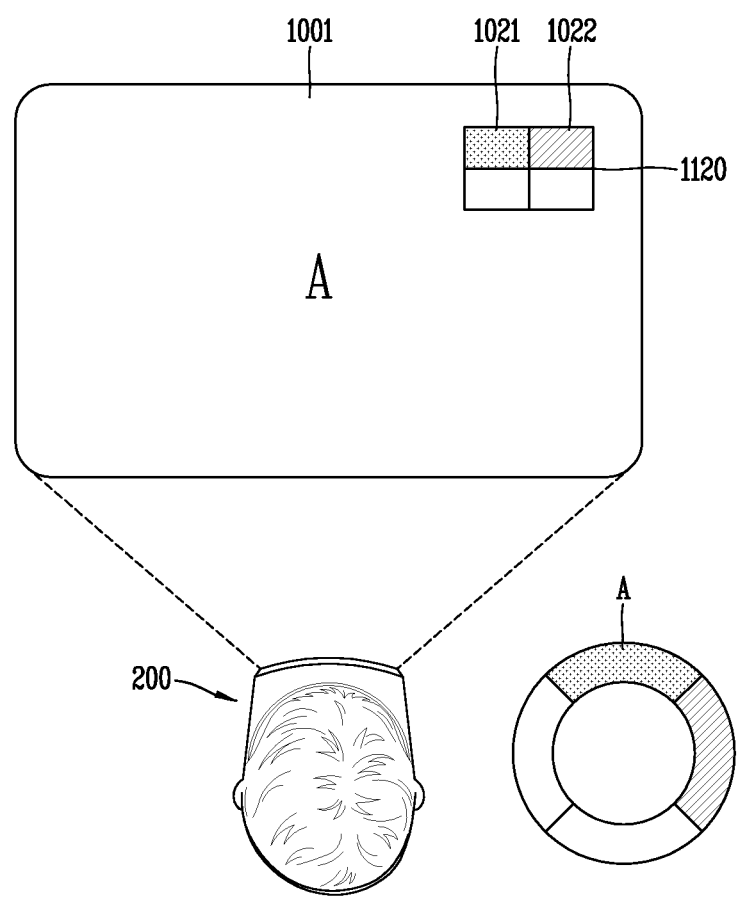
FIGS. 11A and 11B are conceptual views for explaining a method of providing a current position of the pointer on an HMD associated with the present disclosure.
Figure 11B:
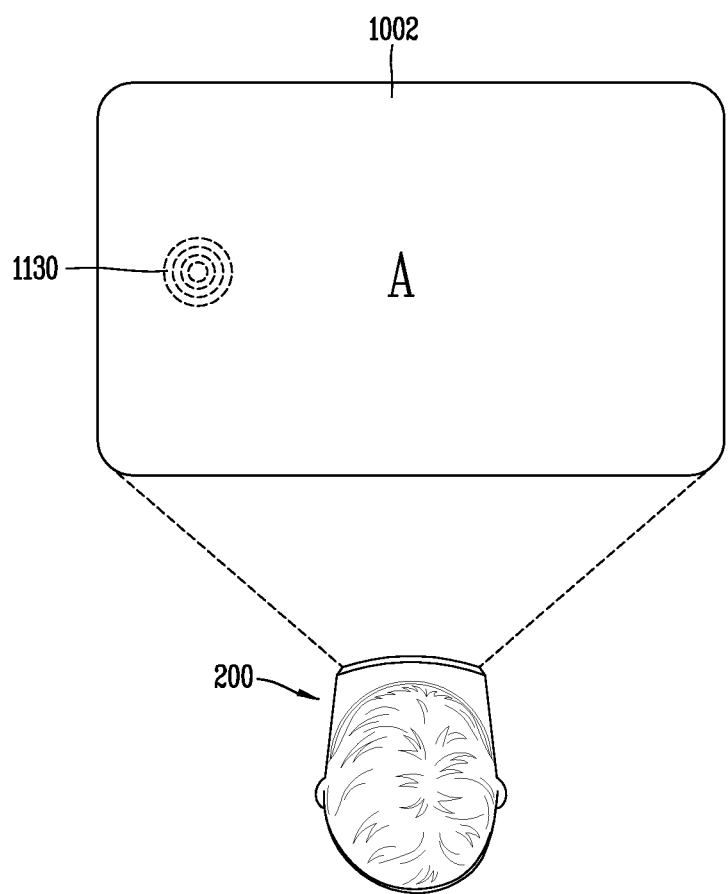

Hereinafter, FIGS. 11A and 11B illustrate the examples of a method for displaying a position to which the pointer is fixed on a current screen to control a region out of the field of view to which the pointer is fixed.

FIG. 11A illustrates an example in which the position information of the pointer is displayed at one point of a current screen region in association with the position of the current screen region.

Specifically, when the pointer is fixed to the first region of the virtual space content and the second region of the virtual space content is displayed on the display unit 251 and thus the pointer is out of the field of view, the controller may display notification information for notifying a relative position of the pointer in the displayed second region. In FIG. 11A, as an example of the notification information, it is seen that the position 1021 of the current screen region (A) 1001 and the relative position 1022 of a region to which the pointer is fixed based thereon are displayed with different graphic objects on a specific image 1120 shown in which a 360 degrees virtual space is divided into four. According to this, it is seen that the location 1022 of a region to which the pointer is fixed is located in the right 90 degrees direction from the current screen region. On the other hand, another image indicating a relative position of a region to which the pointer is fixed, for example, an arrow image or the like, may be expressed instead of the illustrated specific image 1120.

In this state, when the current screen region (A) is switched to another region of the virtual space content along a user's head gesture, a changed relative position of the pointer is reflected on notification information. For example, when the user moves his or her head in the left 90 degrees direction in FIG. 11A, the relative position 1022 of a region to which the pointer is fixed may be moved and displayed at a lower row. According to this, a position to which the pointer is fixed in a currently displayed screen region may be visually seen, thereby recognizing which region of the invisible regions to be controlled.

Furthermore, though not shown in the drawing, when a specific event occurs in a region to which the pointer is fixed, a preset effect, for example, blinking effect or highlighting effect, may be provided to the relative position 1022 of a region to which the pointer is fixed on the specific image 1120 in FIG. 11A to induce the user's confirmation.

Furthermore, according to an embodiment, the controller may control notification information for notifying the current position of the pointer to be displayed only when a preset trigger signal is received to minimize blank screen.

For another example, FIG. 11B illustrates an example in which the pointer is displayed at a specific position of the current screen region using the touch screen 151 of the mobile terminal 100 without providing the current position of the pointer.

To this end, here, it is assumed that the coordinates of the screen region (A) displayed on the display unit 251 match the coordinates of the touch screen 151 of the mobile terminal 100 in a corresponding manner. Here, it may be difficult to know which point of the touch screen 151 has been touched by a user who wears the HMD 200, and thus the controller may display only the position of the displayed screen region (A) matching an initial touch without generating a control command for the initial touch applied to the touch screen 151 with a modified pointer 1130. For such an example, as illustrated in FIG. 11B, a blur effect may be shown in the displayed screen region (A) as an example of the modified pointer at a point or in a region matching an initial touch point applied to the touch screen 151. Then, when a consecutive touch input is applied to the touch screen 151, the controller may generate a control command to a matching point in the displayed screen region (A).

Furthermore, the modified pointer 1130 may be moved along a path on which a touch input applied to the touch screen 151 is dragged, and when the touch input applied to the touch screen 151 is released, it may disappear on the displayed screen region (A).

On the other hand, various embodiments for generating a control command for a region to which an invisible pointer is fixed on the display unit 251 while maintaining the display status of a current screen region in association with the foregoing steps S40 and S50 will be described below in detail with reference to FIGS. 12A, 12B, 13A, 13B, 14A and 14B.

Figure 12B:
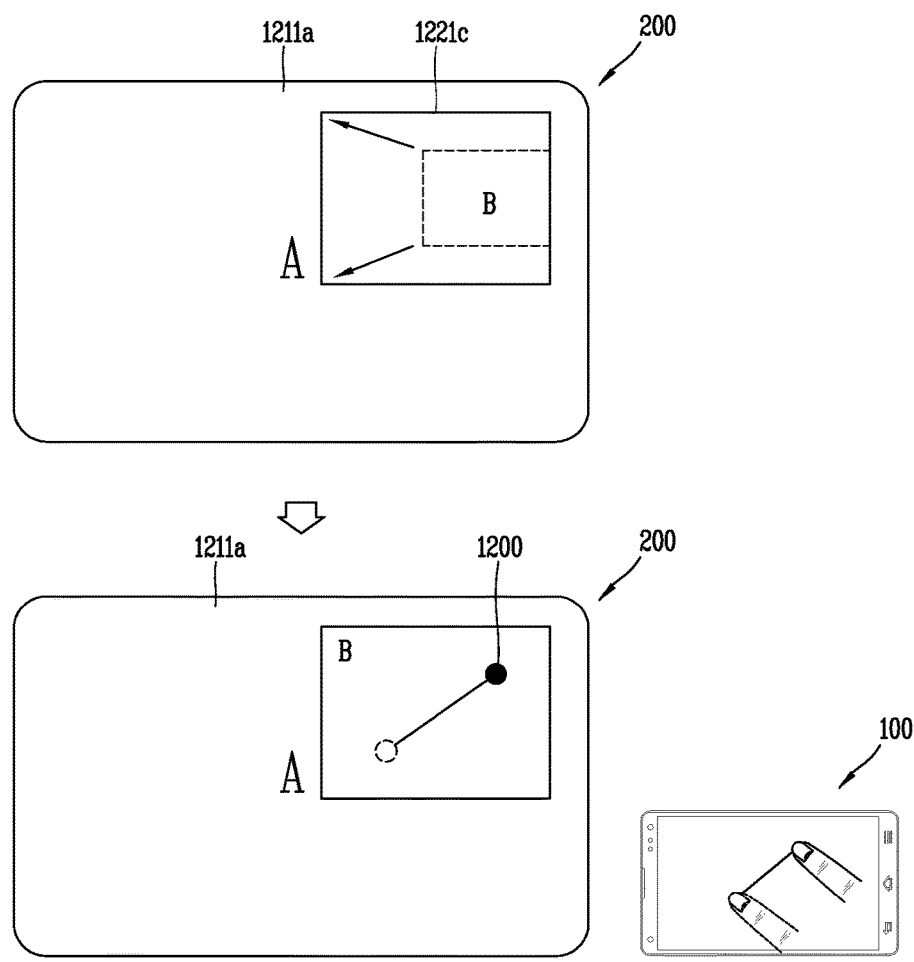

First, FIGS. 12A and 12B illustrate an example of a method for displaying part of a region to which the pointer is fixed on a current screen region to allow the user to control a region out of the field of view.

Specifically, when a wireless signal corresponding to a preset drag touch input applied to the touch screen 151 of the mobile terminal 100 is received in a state that the pointer is fixed to the first region of the virtual space content, and the first region is switched to the second region along a user's head gesture, the controller of the HMD 200 may display part of the first region to which the pointer is fixed in the currently displayed second region.

Here, the preset drag touch input may be an input in which a touch input at a touch point started from an edge of the touch screen 151 is dragged to a side of the center of the touch screen 151. Furthermore, part of the first region may be a region around a position to which the pointer is fixed in the first region.

Furthermore, the controller may limit part of the first region to be shown in a condition that a drag touch input applied to the touch screen 151 is maintained. In such a case, when a drag touch input applied to the touch screen 151 is released, part of the first region shown at one point of the second region may disappear on the second region while a size thereof is gradually being decreased or becoming transparent.

Furthermore, part of the first region to which the pointer is fixed may be shown in a predetermined region of the displayed screen region, for example, a PIP image 1221a, 1221b at an upper right end, as illustrated in FIG. 12A. The PIP image 1221a, 1221b disappears on the display unit 251 if there is no input within a predetermined period of time.

Furthermore, a size of the PIP image may vary according to the variation of a touch amount of a drag touch input applied to the touch screen 151. For example, as a touch amount of a drag touch input applied to the touch screen 151 increases, the size of the PIP image may increase as illustrated in FIG. 12B (1221c). On the contrary, when a touch amount of a drag touch input applied to the touch screen 151 decreases, the size of the PIP image decreases.

Then, when a drag touch input exceeding a reference pressure is consecutively applied to the touch screen 151 within a predetermined period of time, as illustrated in FIG. 12B, a pointer 1200 moving along a path on which the drag touch input is dragged may be displayed within the PIP image. Accordingly, the user may perform a fine control while checking a region located out of the field of view within a current screen.

Furthermore, the display unit 251 may display the displayed second region in a PIP format, and control a pointer and the entire first region to which the pointer is fixed to be shown on the entire surface of the display unit 251 in response to a screen switching signal, for example, an input signal received at a specific key, in a state that part of the first region is shown in a PIP image within a currently display screen region. In other words, as illustrated in FIG. 12A, a currently displayed region (A) 1211a is switched to a PIP image (1221b), and a previous region (B) 1221a that has been displayed as a PIP image is displayed on the entire region of the display unit 251. Here, the pointer 1200 that has been displayed within a PIP image also moves to the entire surface of the display unit 251 (1200"). In this manner, when a PIP image and a currently displayed screen region are switched, vibration, sound or the like may be outputted as a predetermined feedback signal.

On the other hand, when control on an invisible region (B) is ended, the screen region (A) that has been previously displayed may remain on the entire surface of the display unit 251.

As described above, according to the present disclosure, an image out of the field of view may be temporarily displayed as a PIP image to allow the user to control a region out of the field of view to which the pointer is fixed while continuously viewing one region of the virtual space content. Accordingly, the user may control another region out of the field of view with the pointer while continuously viewing a current screen region without moving his or her head to control the region out of the field of view.

Figure 13A:
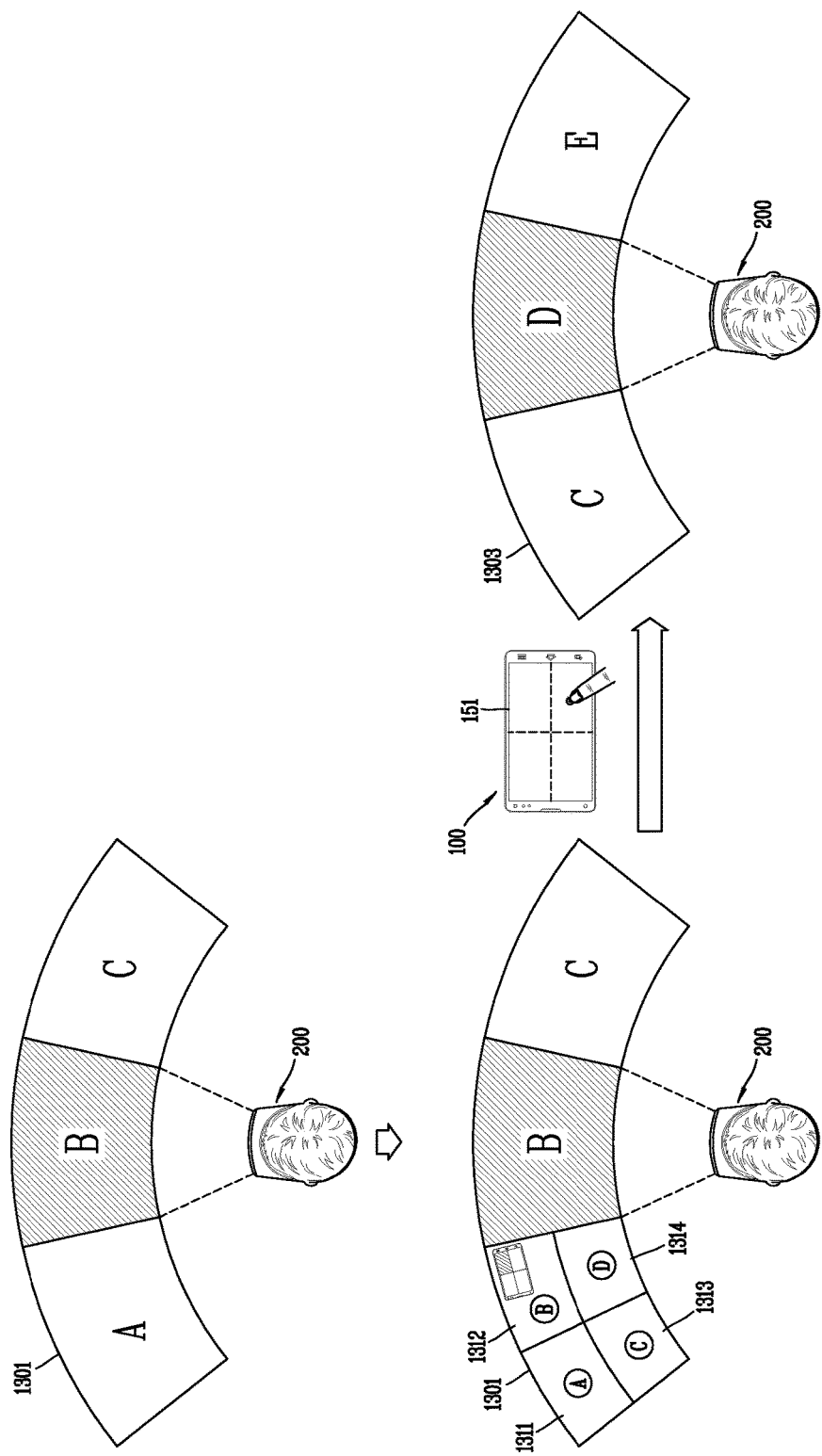

Next, FIGS. 13A and 13B illustrate an example in which a control command for a region to which the pointer is fixed is generated using a touch input to the touch screen 151 of the mobile terminal 100. Specifically, FIG. 13A illustrates an example in which a region to which the pointer is fixed is used as a whole space mode of the virtual space content based on a touch input to the touch screen 151, and FIG. 13B illustrates an example in which a region to which the pointer is fixed is reset based on a touch input to the touch screen 151.

First, in FIG. 13A, when a preset input (for example, an input to a specific key, a preset voice input or gesture input) is applied in a state that the second region (B) of the virtual space content is displayed on the display unit 251 and the pointer is fixed to the first region (A) out of the field of view, a whole space mode may be carried out in the first region (A) to which the pointer is fixed while maintaining the display of the second region (B). When a whole space mode is carried out as described above, a plurality of partitioned regions 1311, 1312, 1313, 1314 corresponding to a plurality of viewing angles of the virtual space content are shown in the region (A) 1301 to which the pointer is fixed, for example, as illustrated in FIG. 13A. Furthermore, the plurality of partitioned regions 1311, 1312, 1313, 1314 respectively match a plurality of virtual regions on the touch screen 151.

On the other hand, an execution screen of the whole space mode is not displayed in a current screen region (B) of the display unit 251, and shown only for a case where a user moves his or her head toward a region to which the pointer is fixed. Next, the controller may allow a touch region corresponding to a touch point of a touch input applied to the touch screen 151 to match any one of the plurality of partitioned regions 1311, 1312, 1313, 1314 to switch a currently displayed screen region to a screen region ("D") corresponding to the matched touch region. In other words, the output of the execution screen in a whole space mode is restricted, but a subsequently received input is processed as an input of a control command for the execution screen in a whole space mode. Accordingly, as illustrated in FIG. 13A, a user may quickly move it to another region of the virtual content using a region out of the field of view to which the pointer is fixed without moving his or her head at all.

Furthermore, the controller may display information for notifying the position of a screen region ("D") currently displayed on the display unit 251 at one point of the current screen region ("D") in the virtual space content.

For another embodiment, a region to which the pointer is fixed may be reset to correspond to the direction of a drag touch input applied to the touch screen 151. For example, in FIG. 13B, in case where the pointer is fixed in the right 90 degrees direction of the screen region (B) 1332 corresponding to a current viewing angle (1333), when a touch input started from one point of the touch screen 151 is dragged, a region 1333 to which the pointer is fixed may be moved to a next region ("D") 1334 corresponding to the dragged direction.

Here, as illustrated in FIG. 13B, as a region to which the pointer is fixed moves, a screen region displayed on the display unit 151 may rotate at the same time. However, the pointer is fixed to the moved screen region ("D") 1334 other than a current screen region.

Similarly, when a touch input started from one point of the touch screen 151 is dragged in the right direction in a state that that the screen region ("C") 1333 is displayed, the pointer may be changed again to the previous region ("C") 1333 corresponding to a direction in which the region 1334 to which the pointer is fixed is dragged, and a screen region displayed on the display unit 151 may be also changed at the same time (1332). In other words, in actuality, it is a control command for moving a region to which the pointer is fixed, but a visual effect of changing a viewing angle is provided to a user who wears the HMD 200.

On the other hand, according to another embodiment, only a region to which the pointer is fixed may be reset while maintaining the display of a current screen region, and an indicator indicating that the region to which the pointer is fixed is reset may be displayed in a current screen region. In this case, for example, the pointer may be fixed to a home screen or a screen region of a specific application, and various events occurring in the relevant region may be checked on a current screen. The embodiment associated with an event will be described in more detail below.

In the above, the examples of controlling an invisible region on the assumption of a state in which one pointer is fixed. In this case, in order to control another invisible region, there is a restriction in that the fixed pointer should be moved to another region or a currently shown screen region should be changed to a desired viewing angle region.

As a result, a method of quickly executing control on a plurality of invisible regions without the user moving his or her head by extending the concept of the pointer will be described below in detail.

Figure 14A:
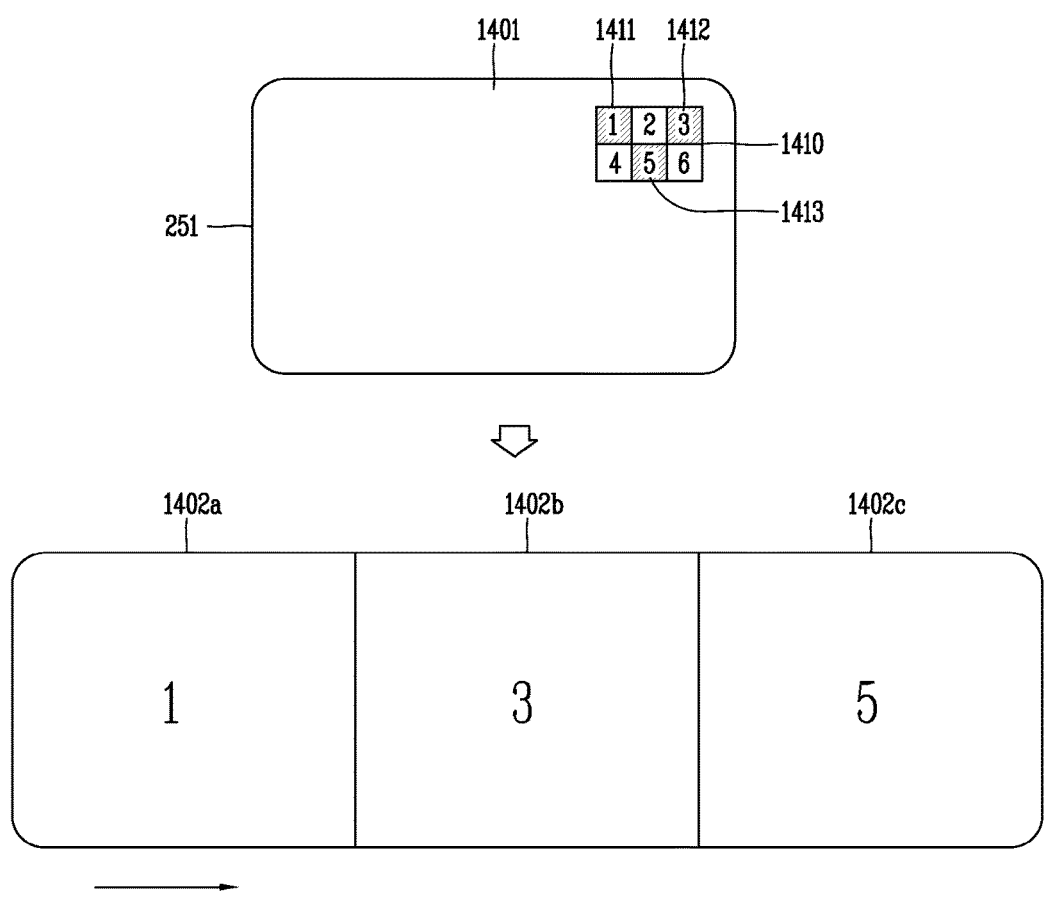

First, FIG. 14A illustrates an example in which a plurality of other invisible viewing angle regions are selected in advance in a state that a first viewing angle region to change a viewing angle region. For the purpose of this, a thumbnail image 1410 in a rectangular shape including a plurality of partitioned regions matching a plurality of viewing angle regions may be displayed in one region of a currently displayed screen region 1401. Here, the thumbnail image 1410 may correspond to a shape of the touch screen 151 of the mobile terminal 100. Furthermore, the positions of a plurality of partitioned regions within the thumbnail image 1410 may match the positions of a plurality of virtual touch regions within the touch screen 151.

Furthermore, according to an embodiment, the thumbnail image 1410 may be displayed when a preset signal is received. In other words, when an input signal for changing a currently displayed viewing angle region is received, the controller may display the thumbnail image 1410 in one region of the display unit 251, and then recognize it as the selection of a next viewing angle region according to a signal corresponding to a touch input applied to the touch screen 151.

In this manner, when the thumbnail image 1410 is displayed, the user may apply a touch to a touch region matching only regions within the thumbnail image 1410 on the touch screen 151 to select different viewing angle regions. Accordingly, a first viewing angle region 1411, a second viewing angle region 1412, and a third viewing angle region 1413 matching a plurality of touch regions applied to the touch screen 151 may be selected, and the display of the selected region may be visually shown on the thumbnail image 1410.

When a plurality of viewing angle regions are selected as described above, the selected plurality of viewing angle regions are displayed on the display unit 251 at predetermined time intervals. In other words, a user may view content with a changed viewing angle image at predetermined time intervals without moving his or her head. For example, as illustrated in FIG. 14A, in the order of touch inputs being applied to the touch screen 151, a first viewing angle region 1402a, a second viewing angle region 1402b, and a third viewing angle region 1402c are displayed on the display unit 251 at intervals of several seconds. Here, a predetermined image (for example, different color, highlighting effect, etc.) may be shown in a region within the thumbnail image 1410 matching a currently displayed viewing angle region.

On the other hand, when a preset signal is received again, the display status of a viewing angle region that has been displayed at the relevant time point may be maintained while the thumbnail image 1410 disappears.

Figure 14B:
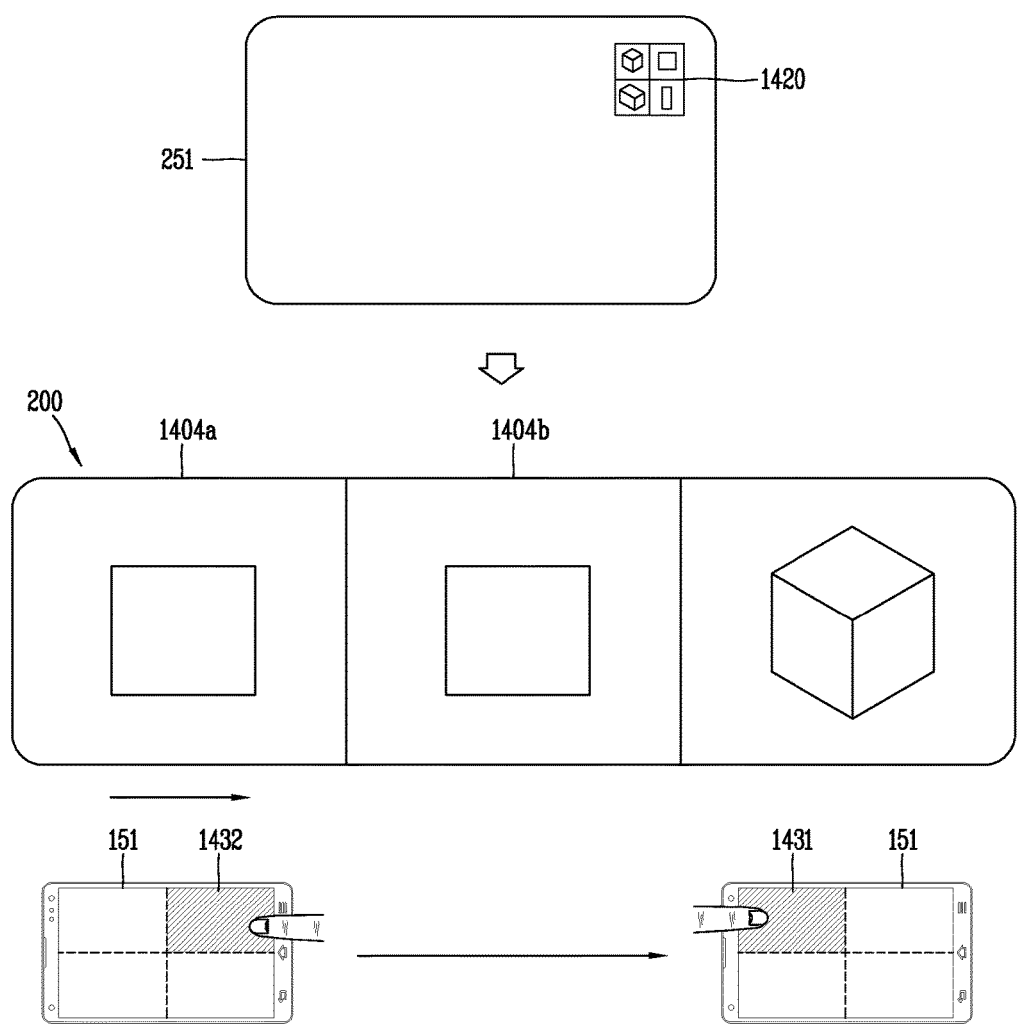

Next, FIG. 14B illustrates an example in which a user does not select a desired viewing angle region in advance, and immediately changes the viewing angle region based on a touch region of a touch input applied to the touch screen 151.

To this end, another thumbnail 1420 in a rectangular shape including a plurality of partitioned regions matching a plurality of viewing angle regions may be displayed in one region of the currently displayed screen region 1401 similarly to FIG. 14B. However, the thumbnail image 1420 illustrated herein may indicate the position of a touch region of a touch input applied to the touch screen 151, and may be displayed for a predetermined period of time and then disappear only when the display is omitted or a touch input is applied to the touch screen 151.

In FIG. 14B, when a user applies a touch input to one touch region 1432 of a plurality of partitioned virtual regions on the touch screen 151, a viewing angle region 1404a matching the relevant touch region 1432 is displayed on the display unit 251 of the HMD 200. In this state, even though the relevant touch region is released on the touch screen 151, a viewing angle region displayed on the display unit 251 is continuously maintained (1404b). Then, when a touch input is applied to another touch region 1431 of the touch screen 151, a current viewing angle region 1404b is switched to a viewing angle region 1404c matching the relevant touch region 1431. In other words, a viewing angle screen displayed on the display unit 251 of the HMD 200 may move at once to another viewing angle screen selected through the touch screen 151.

Figure 15:
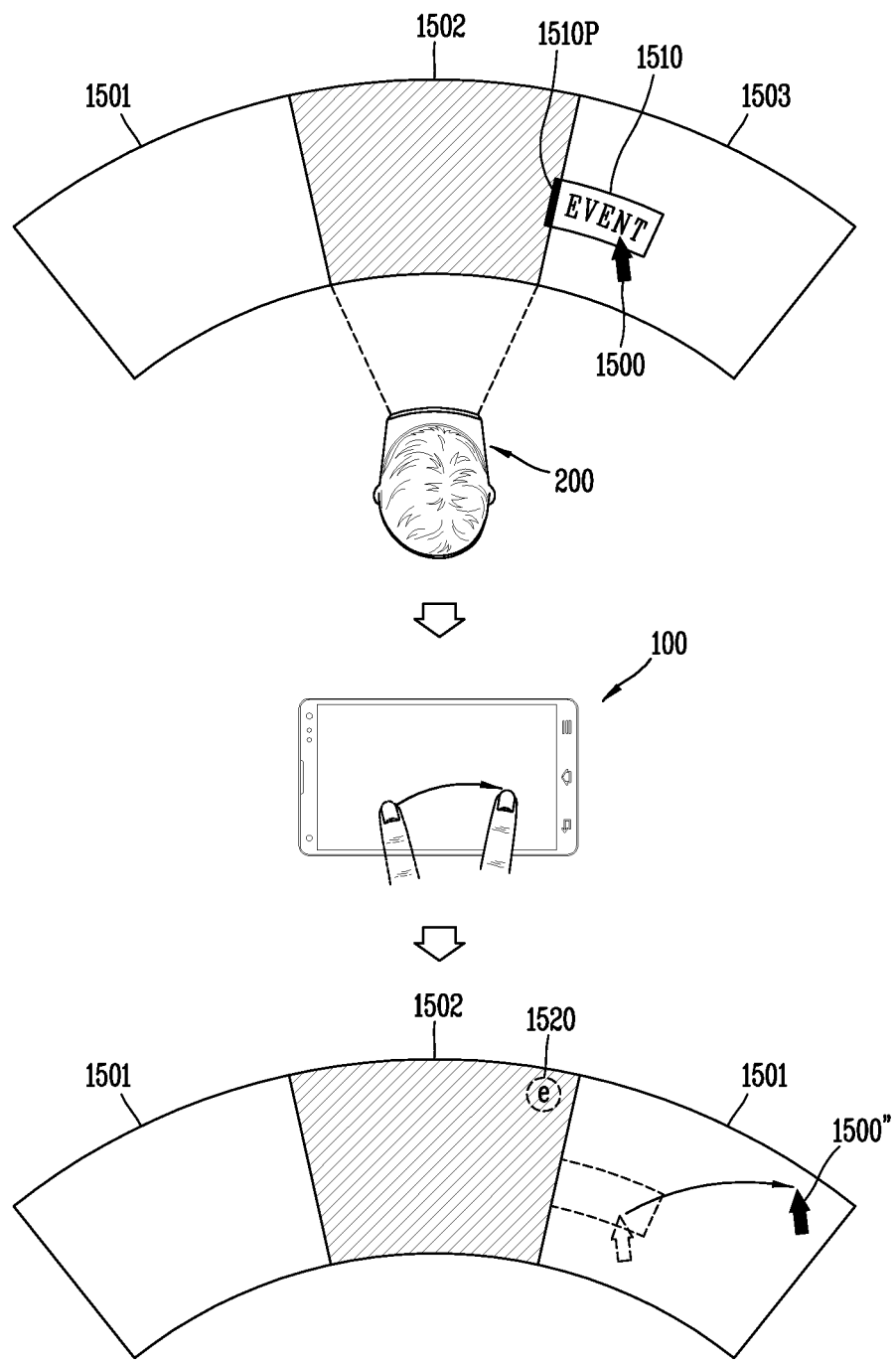

Next, FIG. 15 illustrates an example in which an event is processed while maintaining a current viewing angle region when the event occurs in a region out of a field of view to which the pointer is fixed.

Here, the event may be divided into a setting type event and an execution type event according to the type of the occurred event.

For example, the setting type event, as an event occurring when the setting of the mobile terminal 100 or HMD 200 is changed, the setting type event may occur when a setting such as Wi-Fi (ON setting, OFF setting, or Access setting to specific AP, etc), Bluetooth (ON setting, OFF setting, or Access setting to specific device, etc.), data network (ON setting, OFF setting), sound (Sound ON setting, OFF setting, vibration, mute, etc.), background image (or wallpaper), volume control, GPS (ON setting, OFF setting), Hotspot, application lock setting, lock screen, whether or not a call is made, font size or the like is changed. Furthermore, in addition to the foregoing examples, the controller 180 or controller may determine that an event has occurred even when the others settings of the mobile terminal 100 or HMD 200 are changed.

For another example, the execution type event, as an event occurring when a specific action is executed on the mobile terminal 100 or HMD 200, the execution type event may occur when a message is sent, an application, music play, video play, a web browser or the like is executed. Furthermore, in addition to the foregoing examples, the controller 180 or controller may determine that an event has occurred even when the others settings of the mobile terminal 100 or HMD 200 are changed.

On the other hand, when one region of the virtual space content is displayed on the display unit 251 of the HMD 200 as in the present disclosure, it may be limited such that notification is outputted only for an event associated with currently displayed one region for immersive viewing. However, even when an event occurs in a region out of the field of view, it may be processed in a different manner from the other regions.

Specifically, even when an event occurs out of the field of view, a call, a message or the like may be displayed on a current screen region, but for an event limited to a specific region or an unimportant event occurs, the occurrence of the event may be notified only for the event occurred in a region to which the pointer is fixed. In this case, an event occurred in a region to which the pointer is fixed out of the field of view may be processed while maintaining a currently displayed on region.

Specifically, when an event occurs in a first region to which the pointer is fixed, the controller may generate a control command for processing the event based on a touch gesture applied to the touch screen 151 of the mobile terminal 100 while maintaining the display status of a second region displayed on the display unit 251.

For example, when an event occurs in the first region 1503 in a state that the second region 1502 is displayed on the display unit 251 of the HMD 200 and the pointer 1500 is fixed to the first region 1503 out of the second region, part 1510P of the notification information 1510 for notifying the occurrence of the event may be shown in a predetermined region of the displayed second region 1502, for example, a side edge region thereof.

Here, though it is illustrated in FIG. 15 that the first region 1503 is displayed as a viewing angle region adjacent to the displayed second region 1502, but the present disclosure may not be necessarily limited to this, and for example, when another region exists between the first region 1503 and the second region 1502 or the second region is a region 1501 adjacent to the left side of the first region 1503, part 1510P of the notification information 1510 and the remaining portion thereof may be separated without being connected to each other.

For another example, the position at which part 1510P of the notification information is shown may correspond to the position of the first region 1503 based on a current screen region. In this case, when an event occurs in a state that the pointer is fixed to the first region 1503, part 1510P of the notification information may be shown in a left edge region of the displayed second region 1502.

Furthermore, when part 1510P of the notification information is shown as described above, the controller processes a signal corresponding to a touch gesture applied to the touch screen 151 of the mobile terminal 100 as an input signal for an event occurred in a region to which the pointer is fixed.

For such an example, it may be processed that the occurred event has been checked in response the display of part 1510P of the notification information and the application of a touch gesture dragged in a parabolic shape to the touch screen 151 in FIG. 15. Here, as an event occurs, the pointer 1500 fixed to the first region 1503 may be located at one point of the notification information 1510 for notifying the occurrence of the event and then move along the movement path of the touch gesture (1500"). However, the movement of the pointer is not shown in a current screen region displayed thereon.

Furthermore, when an event is processed based on the touch input, the controller may display a second notification information 1520 for notifying the processing of the event in one region of the displayed second region 1502, for example, at an upper end of the screen. Here, information associated with the event, for example, an application corresponding to the event, a number of events that have occurred, an execution state of the event, and the like, and information on the position of a region in which the event has occurred may be displayed on the second notification information 1520.

In this state, when a user fixes his or her line of sight to the second notification information 1520, event information corresponding to the second notification information 1520 may be shown along with the pointer in a current screen region, namely, the second notification information 1520. Alternatively, for another embodiment, when the user fixes his or her line of sight to the second notification information 1520, the second region 1502 may be switched to the first region 1503 in which the event has occurred on the screen.

Furthermore, the controller of the HMD 200 according to the present disclosure may display an image indicating an important event that has occurred in a region out of the field of view to which the pointer is not fixed and an image indicating an event that has occurred in a region out of the field of view to which the pointer is fixed, in a different manner. For example, the notification of an event that has occurred in a region to which the pointer is fixed may be visually seen that it can be immediately processed while maintaining a current screen region using the fixed pointer.

According to the foregoing embodiment, in case of an event that has occurred in a region out of the field of view to which the pointer is fixed, it may be displayed in a distinguished manner from an event that has occurred in another region out of the field of view, and convenience capable of immediately processing an event occurred in an invisible region is provided.

Figure 16A:
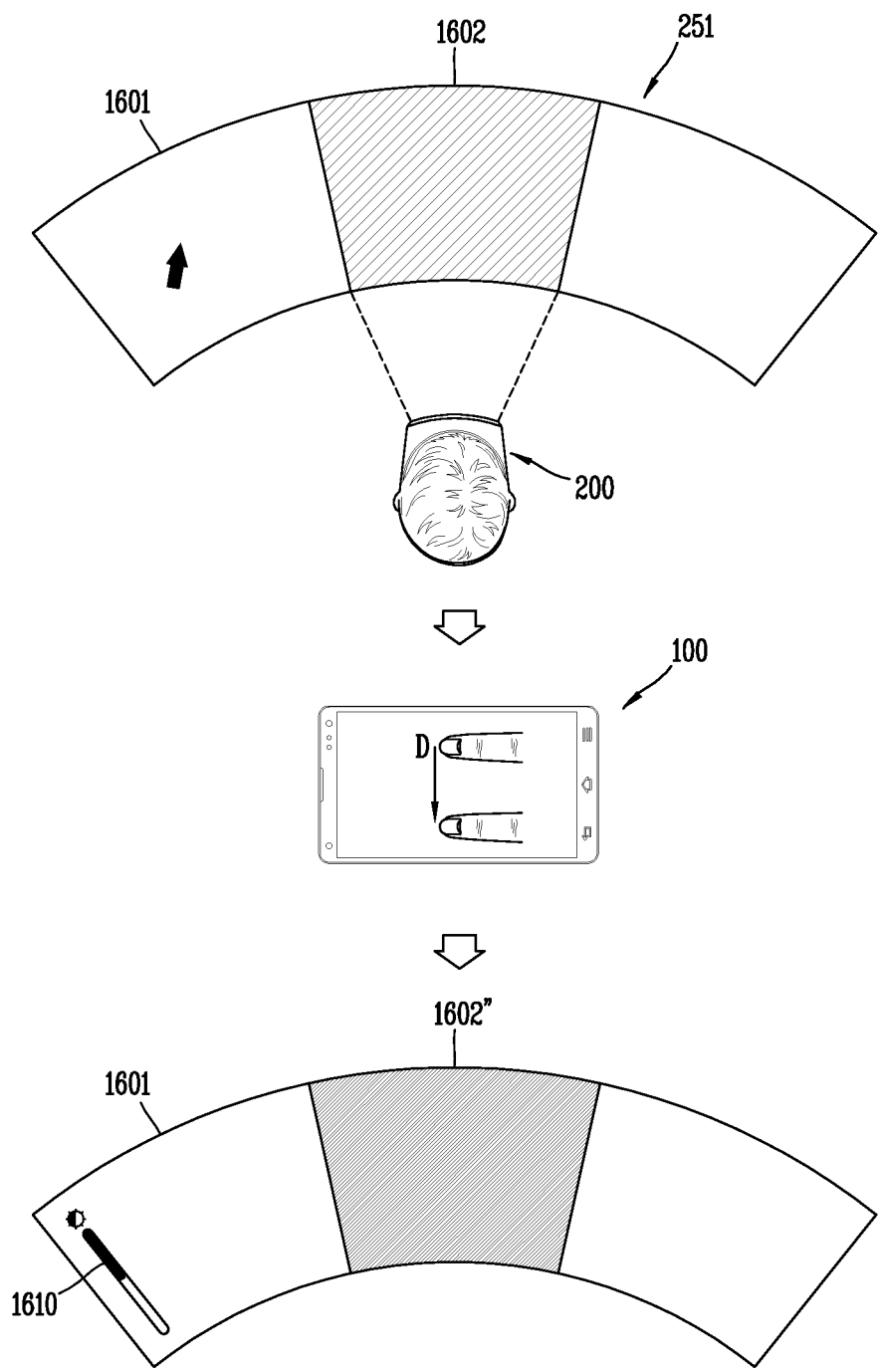
Figure 16B:
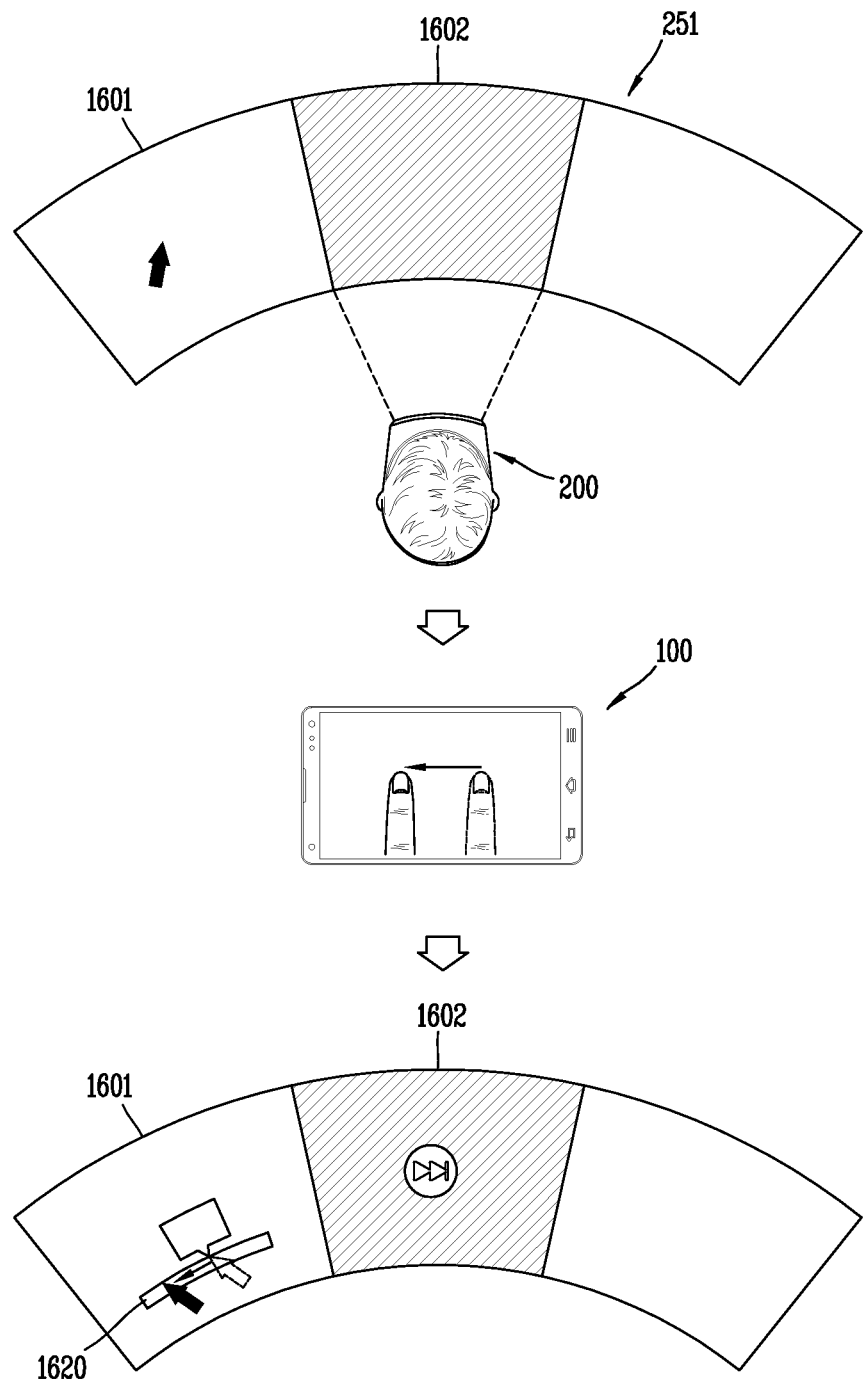

Next, FIGS. 16A and 16B illustrate the embodiments of generating a control command for changing a setting for a current screen region using a region to which the pointer is fixed.

FIGS. 13A, 13B, 14A, 14B, 15, 16A, and 16B are conceptual views for explaining various examples in which a control result of a region to which the pointer is fixed is applied to a current screen region using a touch screen of a mobile terminal on a head mounted display associated with the present disclosure.

To this end, the controller of the HMD 200 may change a first region to which the pointer is fixed to a control region for changing the screen setting of a currently displayed second region based on a preset touch input applied to the touch screen 151 of the mobile terminal in a state that the second region is displayed on the display unit 251 and the pointer is fixed to the first region out of the display unit 251. Here, the type of the control region may be determined to be different according to the type of content in the currently displayed second region and the type of a command input region included in the second region. For example, when the content of the displayed second region is associated with a broadcast program, the control region may be a region for changing or adjusting a channel, a volume or the like.

Furthermore, when an input signal corresponding to an initial touch input applied to the touch screen 151 is received, the controller matches a touch point of the initial touch input to a position of the pointer fixed to the first region. In other words, the initial touch input applied to the touch screen 151 may be recognized as a touch input applied to the pointer of the first region.

Then, various control commands using the pointer may be generated according to a touch input consecutively applied to the touch screen 151. For such an example, the pointer may be moved, a specific object may be pointed, or an input of a predetermined control command may be generated based on the consecutive touch input.

Here, the control command may be limited to a control command associated with the setting of a screen region displayed on the display unit 251. Furthermore, the control command may be differently determined according to a type of touch input consecutively applied to the touch screen 151, a touch amount, a touch maintaining time, and the like. Furthermore, the controller may call or search a setting value for a current screen region to correspond it to a current position of the pointer, and adjust a change amount of the setting value according to the movement path of the pointer corresponding to a touch input applied to the touch screen 151.

Furthermore, the controller may limit the control region from being displayed in a currently displayed second region, and controls only an execution result of a control command received in the control region to be shown in the displayed second region. However, when the currently displayed screen region 1602 is switched to the first region 1601 to which the pointer is fixed as a user moves his or her head in FIGS. 16A and 16B, a control region corresponding to the first region 1601 is only then displayed.

FIG. 16A is an example in which a region to which the pointer is fixed is used as a control region for adjusting the screen brightness of a current screen region.

To this end, the region to which the pointer is fixed may include a scroll bar for adjusting the brightness of the screen. The scroll bar 1610 may be displayed on the display unit 251 at a time point at which a user moves his or her head to display a region to which the pointer is fixed.

Next, the controller may control the pointer or modified pointer to adjust a scroll amount of the scroll bar based on the dragged direction and dragged amount of the touch input, and immediately control the screen brightness of the currently displayed second region to correspond to the scroll amount of the scroll bar. For example, as a touch gesture dragged in a downward direction is applied on the touch screen 151 in FIG. 16A, the scroll bar controlled by the pointer in the first region 1601 out of the field of view to which the pointer is fixed may be popped up, and the screen brightness of the second region 1602" displayed on the display unit 251 may be gradually decreased at the same time.

Here, though not shown in the drawing, when a touch gesture applied to the touch screen 151 is dragged in an upward direction without being released, the screen brightness of the displayed second region may be gradually increased. Here, information for notifying the changed screen brightness may be shown and then disappear in one region of the second region.

For another embodiment, when an initial touch input is applied to the touch screen 151, it may be possible to match it to a position of the pointer fixed to the first region 1601 and then generate a control command for adjusting a scroll bar and a scroll amount of the scroll bar when a touch gesture in which a touch input is dragged in an upward and downward direction is consecutively applied. In this case, a control command for changing a setting value of screen brightness is generated at a time point at which a touch gesture in which a touch input is dragged in an upward and downward direction is applied.

For another embodiment, FIG. 16B is an example in which a region to which the pointer is fixed is used as a control region for adjusting the playback time point of a current screen region.

To this end, the region to which the pointer is fixed may include a playback bar 1620 for adjusting the playback of a current screen. The playback bar 1620 may be displayed on the display unit 251 at a time point at which a user moves his or her head to display the region to which the pointer is fixed.

Next, the controller may control the pointer or modified pointer to adjust a scroll amount of the scroll bar based on the dragged direction and dragged amount of a touch input applied to the touch screen 151, and change the playback time point of a currently displayed second region to correspond to the scroll amount of the playback bar.

Here, though not shown in the drawing, a thumbnail image indicating a playback time point to be changed may be popped up in one region of the second region while dragging or maintaining a touch input applied to the touch screen 151. Here, a position of the popped-up thumbnail image may correspond to a playback time point. Accordingly, inconvenience in which the pointer should be displayed on the display unit 251 and then brought to a current playback position of the playback bar to adjust a playback time point will be solved.

According to the foregoing embodiment, a region to which the pointer is fixed may be used as a control region associated with the setting of a current screen to match a position of the pointer to a position of an initial touch input of the touch screen 151, thereby changing a specific setting of a current screen region while applying the pointer concept.

Furthermore, though not shown in the drawing, when a function executed in a command input region included in the first region is maintained in the second region in a state that the pointer is fixed to the first region and the second region is displayed, it may be possible to control the function being executed in the command input region included in the first region to which the pointer is fixed in response to a touch input applied to the touch screen 151.

For example, when a sound play window is included in the first region to which the pointer is fixed, and a playback sound on the sound play window is played back as a background sound even after being switched to the second region, it may be possible to adjust the volume of a background sound in the second region or for example change a sound being played back to another one based on a tap applied to the touch screen 151 based on the drag direction and drag amount of a touch input applied to the touch screen 151.

Furthermore, according to the present disclosure, the generation of a control command to a region to which the pointer is fixed and the control of a current screen have been described to be controlled by the controller of the HMD 200, but the operations may be also carried out through the controller 180 of the mobile terminal 100 connected thereto.

As described above, according to an HMD device and an operation method thereof according to the present disclosure, it may be possible to check a specific region or generate a control command for a specific region without moving a head while maintaining a currently displayed viewing angle region through the HMD. Furthermore, it may be possible to quickly move the currently displayed viewing angle region to a viewing angle region to which the pointer is fixed without any head gesture.

The foregoing present disclosure may be implemented as codes readable by a computer on a medium written by the program. The computer-readable media includes all types of recording devices in which data readable by a computer system can be stored. Examples of the computer-readable media may include HDD (Hard Disk Drive), SSD (Solid State Disk), SDD (Silicon Disk Drive), ROM, RAM, CD-ROM, a magnetic tape, a floppy disk, an optical data storage device, and the like, and also include a device implemented via a carrier wave (for example, transmission via the Internet). The computer may include the controller 180 of the terminal. The present invention may be embodied in other specific forms without departing from the concept and essential characteristics thereof. The detailed description is, therefore, not to be construed as illustrative in all respects but considered as restrictive. The scope of the invention should be determined by reasonable interpretation of the appended claims and all changes that come within the equivalent scope of the invention are included in the scope of the invention.

What is claimed is:

1. A head mounted display (HMD) device, comprising:
a communication unit configured to perform communication with a mobile terminal;
a display; and
a controller configured to:
cause the display to display a first region of virtual space content received from the mobile terminal;
cause the display to display an object in the first region, wherein the object is for generating a command for a command input region;
cause the object to move according to a user's head gesture while the command input region is displayed in the first region;
cause the display to display a second region of the virtual space content based on the user's head gesture when the command input region is no longer displayed such that the first region is replaced by the second region on the display, wherein the object remains in the first region when the second region is displayed; and
generate a control command for the first region including the object when a preset condition is satisfied while the second region is displayed,
wherein in response to an event that occurs in the first region while the second region is displayed, the controller is further configured to generate a control command for processing the event based on a touch gesture received via a touch screen of the mobile terminal while the displaying of the second region is maintained, and
wherein the controller is further configured to:
execute a whole space mode in the first region in which the object is included in response to an input received while the second region is displayed; and
cause the display to display a third region of the virtual space content instead of the second region in response to a touch input received via the touch screen of the mobile terminal, the touch input received while the whole space mode is executed, and the third region corresponding to a point of the touch screen at which the touch input is received.

2. The HMD device of claim 1, wherein the controller is further configured to:
cause the display to display a second command input region in the second region such that the object is displayed in the second command input region; and
generate a control command for the second command input region in response to manipulation of the object.

3. The HMD device of claim 2, wherein:
the controller is further configured to cause the display to display the object in a third command input region in response to a touch input received via the touch screen of the mobile terminal, the touch input received while the object is displayed in the second command input region of the second region; and
the third command input region is included in the second region or another region of the virtual space content.

4. The HMD device of claim 2, wherein the controller is further configured to cause the display to display a next region of the virtual space content in response to a touch input received via a touch screen of the mobile terminal while the second region is displayed, the next region including a next command input region indicated by the object when the touch input causes the object to move to the next command input region.

5. The HMD device of claim 1, wherein:
the controller is further configured to cause the object to move within the command input region of the first region in response to a drag touch input received via the touch screen of the mobile terminal;
the drag touch input exceeds a reference pressure applied to the touch screen;
the drag touch input is received while the object is displayed in the command input region of the first region; and
the object moves based on a path of the drag touch input.

6. The HMD device of claim 1, wherein:
the controller is further configured to cause the display to display an image corresponding to the first region in a predetermined region of the second region in response to a touch input received via the touch screen of the mobile terminal; and the touch input is received while the second region is displayed.

7. The HMD device of claim 1, wherein the controller is further configured to cause the display to display notification information for notifying a relative position of the object included in the first region, the notification information displayed at an area of the second region.

8. The HMD device of claim 7, wherein:
the controller is further configured to cause the display to display a third region of the virtual space content according to the user's second head gesture received while the second region is displayed; and
a changed relative position of the object is displayed on the notification information when the third region is displayed.

9. The HMD device of claim 1, wherein the controller is further configured to generate a control command for displaying a part of the first region including the object in the second region in response to a drag touch input received via the touch screen of the mobile terminal, the drag touch input received while the second region is displayed.

10. The HMD device of claim 9, wherein the part of the first region is displayed in a picture-in-picture (PIP) format in a predetermined region of the second region.

11. The HMD device of claim 10, wherein the controller is further configured to cause the display to stop displaying the part of the first region in response to releasing of the drag touch input from the touch screen of the mobile terminal.

12. The HMD device of claim 10, wherein in response to a screen switching input received while the part of the first region is displayed in the PIP format, the controller is further configured to cause the display to:
display the second region in a PIP format; and
display the first region including the object on an entire screen of the display.

13. The HMD device of claim 1, wherein the controller is further configured to cause the display to display a part of a first notification icon for notifying the occurrence of the event at an edge portion of the second region in response to the occurrence of the event in the first region.

14. The HMD device of claim 13, wherein the controller is further configured to cause the display to display a second notification icon for notifying processing of the event at a portion of the second region when the event is processed in response to the touch gesture.

* * * * *